United States Patent
Houser et al.

(10) Patent No.: US 7,838,617 B2
(45) Date of Patent: *Nov. 23, 2010

(54) DYEABLE SPANDEX

(75) Inventors: Nathan E. Houser, Afton, VA (US); Gordon W. Selling, Dunlap, IL (US); Beverly Jean Selle, Wilmington, DE (US); Steven Peter Pardini, Waynesboro, VA (US); Robert Dewhurst, Gloucester (GB); Elizabeth Todd Singewald, Wilmington, DE (US)

(73) Assignee: INVISTA North America s.àr.l., Wilmington, DE (US)

( * ) Notice: Subject to any disclaimer, the term of this patent is extended or adjusted under 35 U.S.C. 154(b) by 95 days.

This patent is subject to a terminal disclaimer.

(21) Appl. No.: 10/904,317

(22) Filed: Nov. 3, 2004

(65) Prior Publication Data
US 2005/0165200 A1 Jul. 28, 2005

Related U.S. Application Data

(63) Continuation-in-part of application No. 10/430,060, filed on May 5, 2003, now Pat. No. 6,916,896.

(51) Int. Cl.
*C08G 18/76* (2006.01)
*C08G 18/10* (2006.01)
*C08G 18/32* (2006.01)
*C08G 18/42* (2006.01)
*C08G 18/48* (2006.01)

(52) U.S. Cl. ............. 528/49; 8/543; 8/926; 139/420 A; 139/420 R; 139/421; 528/48; 528/61; 528/67; 528/76; 528/80; 528/83; 528/906

(58) Field of Classification Search ...................... 8/543, 8/926; 139/420 R, 421, 420 A; 528/48, 49, 528/61, 67, 76, 80, 83, 906
See application file for complete search history.

(56) References Cited

U.S. PATENT DOCUMENTS

| | | | |
|---|---|---|---|
| 3,184,426 A | 5/1965 | Thoma et al. | |
| 3,294,752 A | 12/1966 | Wilkinson | |
| 3,461,101 A | 8/1969 | Oertel et al. | |
| 3,475,377 A | 10/1969 | Rosendahl et al. | |
| 3,553,173 A | 1/1971 | Wieden et al. | |
| 3,557,044 A | 1/1971 | Bleasdale et al. | |
| 3,631,138 A | 12/1971 | Peters | |
| 3,763,058 A | 10/1973 | Oertel et al. | |
| 4,499,221 A | 2/1985 | Saitoh et al. | |
| 4,574,147 A | 3/1986 | Meckel | |
| 4,973,647 A | 11/1990 | Bretches et al. | |
| 5,000,899 A | 3/1991 | Dreibelbis et al. | |
| 5,032,664 A | 7/1991 | Frauendorf et al. | |
| 5,061,426 A | 10/1991 | Frauendorf et al. | |
| 5,500,025 A | 3/1996 | Sharma | |
| 5,512,059 A | 4/1996 | Ido et al. | |
| 5,512,064 A | 4/1996 | von der Eltz et al. | |
| 5,539,037 A | 7/1996 | Oqbal | |
| 5,606,005 A | 2/1997 | Oshita et al. | |
| 5,644,015 A | 7/1997 | Seo et al. | |
| 5,723,563 A | 3/1998 | Lawney et al. | |
| 5,843,357 A | 12/1998 | Senneker et al. | |
| 5,879,799 A | 3/1999 | Yosizato et al. | |
| 5,948,875 A | 9/1999 | Liu et al. | |
| 5,981,686 A | 11/1999 | Waldbauer, Jr. | |
| 6,203,901 B1 * | 3/2001 | Kosinski et al. | ............. 428/364 |
| 6,403,682 B1 | 6/2002 | Goodrich et al. | |
| 6,468,652 B1 | 10/2002 | Tsuru et al. | |
| 6,472,494 B2 | 10/2002 | Houser et al. | |
| 6,497,732 B1 * | 12/2002 | Soane et al. | ................... 8/543 |
| 6,503,996 B1 | 1/2003 | Bretches et al. | |
| 6,635,347 B1 | 10/2003 | Yoshida | |
| 6,639,041 B2 | 10/2003 | Nishikawa et al. | |
| 6,692,828 B2 | 2/2004 | Song et al. | |
| 6,916,896 B2 * | 7/2005 | Selling et al. | ................. 528/49 |
| 2003/0198809 A1 * | 10/2003 | Kang et al. | ................. 428/375 |
| 2004/0068080 A1 * | 4/2004 | Liu et al. | ...................... 528/61 |

FOREIGN PATENT DOCUMENTS

| | | |
|---|---|---|
| GB | 1055402 | 1/1967 |
| GB | 1102819 | 2/1968 |
| GB | 1338948 | 11/1973 |
| GB | 1450213 | 9/1976 |
| JP | 60173117 | 9/1985 |
| JP | 07-082608 | 3/1995 |
| JP | 08-020625 | 1/1996 |
| JP | 08-176268 | 7/1996 |
| WO | WO 02/086208 | 10/2002 |

* cited by examiner

*Primary Examiner*—Rabon Sergent
(74) *Attorney, Agent, or Firm*—Christina W. Geerlof

(57) ABSTRACT

Commercial spandex can be prepared with greater efficiency, improved consistency and at lower costs from a high-solids content polyurethaneurea polymer solution. The polyurethaneurea is prepared using a combination of 4,4'-MDI and 2,4'-MDI, and an amount of chain extenders and chain terminators such that the polymer solution, prior to spinning, is highly soluble and has an appropriate pre-spun IV and primary amine content. Such spandex fibers, and the fabrics and garments comprising them, have good dyeability and colorfastness, as well as other desirable characteristics.

9 Claims, No Drawings

DYEABLE SPANDEX

CROSS REFERENCE TO RELATED APPLICATIONS

This is a continuation-in-part of U.S. application No. 10/1430,060, filed May 5, 2003, now U.S. Pat. No, 6,916,896, issued Jul. 12, 2005.

FIELD OF THE INVENTION

The present invention relates to a highly soluble polyurethaneurea prepared from: (a) at least one polymeric glycol; (b) a diisocyanate mixture comprising: (i) at least about 78 mole percent 1-isocyanato-4-[(4-isocyanatophenyl)methyl] benzene (4,4'-MDI); and (ii) at least about 5 mole percent 1-isocyanato-2-[(4-isocyanatophenyl)methyl]benzene(2,4'-MDI); (c) at least one chain extender; and (d) at least one amine chain terminator. The present invention relates to spandex fibers prepared from the highly soluble polyurethaneurea which have good dyeability and colorfastness, as well as other desirable characteristics. The present invention also relates to fabrics and garments comprising such spandex.

BACKGROUND

Spandex is the generic name for manufactured fiber in which the fiber-forming substance is a long-chain synthetic polymer comprised of at least 85% of a segmented polyurethane. Spandex is also referred to as elastane. For the sake of convenience, and not of limitation, the present invention herein is discussed in terms of spandex, but should be construed to include all embodiments described in the following disclosure and their equivalents.

Spandex is typically prepared in two steps. First a low molecular weight difunctional polymer, such as a polymeric glycol, is allowed to react with a diisocyanate to form a mixture of isocyanate-terminated prepolymer and unreacted diisocyanate ("capped glycol"). The capped glycol is then dissolved in a suitable solvent and reacted with a difunctional chain extender and monofunctional chain terminator composition to form a polyurethaneurea polymer solution. Commercial spandex fiber is then formed from the resulting polyurethaneurea solution using conventional dry-spinning or wet-spinning techniques.

By preparing the polymer in this manner, spandex comprises so-called "hard" segments derived from the reaction between an isocyanate group on the capped glycol and the chain extender. Spandex also comprises "soft" segments derived primarily from the polymeric glycol. It is believed that the desirable elastomeric properties of spandex are due, in part, to this segmented structure.

While both ends of a chain extender, like ethylenediamine, may react with isocyanate groups from the capped glycol, in certain cases only one end of the chain extender may react. The result is a polymer having a chain extender with a primary amine at one end. The number of these "chain extender ends" (CE), expressed as the concentration of ends in milliequivalents per kilogram of polymer, can be determined by measuring the concentration of primary amine in the polymer. Primary amine content can be assayed using conventional techniques.

The number of chain extender ends can be controlled by several means, such as by varying the stoichiometry of chain extender to capped glycol. Alternatively, the number of chain extender ends can be controlled using a chain terminator, such as diethylamine (DEA). A chain terminator reacts with the capped glycol, in the same manner as a chain extender, but does not have a second reactive group. The result is a polymer with a chain terminator end rather than a chain extender end. When diethylamine is used as a chain terminator, the chain terminator end is also called a diethyl urea end (DEU).

By controlling the stoichiometry of chain extender and chain terminator to isocyanate functionalities in the capped glycol, it is possible to adjust the total number of polymer ends and, therefore, the molecular weight and intrinsic viscosity (IV) of the polymer. This is known to be an effective method of controlling the molecular weight and IV of a polyurethaneurea. See, for example, U.S. Pat. No. 3,557,044, the disclosure of which is incorporated herein by reference.

The combination of a desired number of polymer ends with a desired proportion of those being chain extender ends, is an aspect of the present invention and can be described in terms of polymer properties normally measured in the art. As stated previously, the total number of polymer ends is directly proportional to the IV. The greater the number of polymer ends, the lower the molecular weight and the lower the IV. Similarly, the number of chain extender ends is related to the quantity of primary amine in the polymer. Thus, describing aspects of the present invention in terms of desirable IV and amount of primary amine, is the equivalent to describing those aspects in terms of the desirable number of polymer ends and chain extender ends, respectively. The reader is directed to the Examples for further details.

Spandex fiber can be formed from the polyurethaneurea through fiber spinning processes such as dry spinning. In dry spinning, a polymer solution comprising a polymer and solvent is metered through spinneret orifices into a spin chamber to form a filament or filaments. Gas is passed through the chamber to evaporate the solvent to solidify the filament(s). Multiple filaments can then be coalesced into a spandex yarn. The terms "fiber" and "yarn" are used interchangeably herein when referring to spandex fiber and yarn.

Solvents used in polymer solutions should provide a homogeneous solution containing little or no gels. Solvents particularly suitable for dry spinning include N,N-dimethylacetamide (DMAc), N-methylpyrrolidinone (NMP), N,N-dimethylformamide (DMF) and dimethyl sulfoxide (DMSO). Because of safety and cost concerns DMAc is preferred and, indeed, used almost exclusively in the industry.

The productivity of dry spinning is typically described in terms of grams of yarn per spin chamber per hour and is related to winding speed, yarn and filament deniers and to the number of yarns per spin chamber. Such parameters, however, are limited by the volume and solvent used in the polymer solution and the rate of solvent evaporation through the surface of each filament. The rate of evaporation, in turn, is related to the filament denier and to the number of filaments within the spin chamber. For example, an increase in filament denier, while maintaining the total yarn denier, means a decrease in overall filament surface area and a slower rate of solvent evaporation. Winding speed must be reduced in such cases to allow sufficient time for the solvent to evaporate within the spin chamber. Also, the more filaments in a spin chamber, the larger the volume of gas and solvent vapor that must be handled. High volumes of gas induce turbulence which reduces fiber uniformity, process continuity, and productivity. Further, the volume of solvent used and its rate of evaporation from the filaments may affect the physical properties of the spandex fiber such as tenacity.

It has long been recognized that if the amount of solvent used in dry spinning could be reduced (i.e., use a polymer solution with a higher percent solids), the spinning productivity would improve because there would be less solvent to evaporate from the filaments. However, a polymer solution suitable for spandex yarn production containing a maximum of only about 37 percent solids has been possible. Over the years, attempts to prepare more concentrated polymer solutions have been commercially unsuccessful because the polyurethaneurea is insoluble in DMAc above about 37 weight percent. Polymer solutions that contain more than 37 percent solids may exist, initially, but such solutions are unstable and either quickly build viscosity until they exceed the handling capability of process equipment or form gels and become insoluble. Even in those prior cases when manufacturers were actually able to produce spandex from high-solids polymer solutions, the productivity was poor and fiber had unacceptably poor properties.

To be commercially acceptable, spandex fiber must meet certain properties recognized in the industry. While small markets may exist for spandex that does not meet these properties, such niche applications are quite limited. These properties are appreciated by those skilled in the art and include, for example for spandex at 40 denier: IV greater than 0.95 dl/g; Tenacity at least 35 g; Load Power (LP) less than 7 g; Unload Power (UP) at least 0.9 g; and a coefficient of denier variation (CDV) less than 15.

Those skilled in the art will appreciate that properties for commercially acceptable spandex will vary with denier so the above illustration of commercially acceptable spandex "at 40 denier" is not to be construed to limit the present invention either to these properties or to 40 denier spandex. The present invention includes commercially acceptable spandex of other deniers which would have the above-stated properties if they were prepared at 40 denier. Accordingly, reference herein to properties of spandex at 40 denier includes spandex of different denier which would have the recited property if prepared at 40 denier.

SUMMARY OF THE INVENTION

The present invention provides a method of making a polyurethaneurea which, prior to spinning, has an IV between about 0.65 and about 1.0 dl/g and a primary amine content between about 25 and about 70 milliequivalents $NH_2$ per kilogram of polymer solids (meq/Kg), and is prepared by contacting at least one polymeric glycol with a diisocyanate mixture comprising at least about 78 mole percent 4,4'-MDI and at least about 5 mole percent 2,4'-MDI, at least one chain extender, and at least one amine chain terminator.

The present invention also provides a method as above of making a polyurethaneurea polymer which, prior to spinning, has an IV between about 0.65 and about 1.0 dl/g and a primary amine content between about 25 and about 70 milliequivalents $NH_2$ per kilogram of polymer solids (meq/Kg).

The present invention provides spandex having an as-spun primary amine content of at least about 5 meq/Kg which is prepared from the polyurethaneurea described above. The present invention also provides spandex having a boiled-off primary amine content of at least about 3 meq/Kg which is prepared from the polyurethanurea described above.

The present invention further provides spandex wherein the as-spun yarn primary amine content of at least about 5 meq/Kg, which as dyed has an improved color shade lightness $\Delta L$ (taken as an absolute value) of at least about 3.0 on the CIELAB color scale. The present invention also provides spandex, substantially free of dye enhancers, having a boiled-off yarn primary amine content of at least about 3 meq/Kg, which as dyed has an improved color shade lightness $\Delta L$ (taken as an absolute value) of at least about 3.0 on the CIELAB color scale. Color shade lightness L values were determined by spectrocolorimetry by comparison of the color shade lightness L of the spandex of the invention to that for spandex having an as-spun primary amine content of less than about 3 meq/Kg.

The present invention also provides a fabric, as well as a garment comprising the fabric, which comprises the spandex of the invention and at least one fiber selected from the group consisting of protein, cellulosic, and synthetic polymer fibers, or a combination of such members.

DETAILED DESCRIPTION OF THE INVENTION

A spandex manufacturing process of the invention comprises the steps of first preparing a highly soluble polyurethaneurea having a desirable IV (i.e., total ends) and a desirable primary amine content (i.e., chain extender ends), and then preparing a polymer solution comprising said polyurethaneurea in greater than 38 weight percent. Commercially acceptable spandex filaments can be prepared from this polymer solution at rates that significantly exceed rates conventionally used with 37 or less weight percent solutions.

A polyurethane urea of the present invention may be prepared from: at least one polymeric glycol selected from the group consisting of polyether glycols and polyester glycols; a diisocyanate mixture comprising at least about 78 mole percent 4,4'-MDI and at least about 5 mole percent 2,4'-MDI; at least one chain extender; and at least one amine chain terminator; wherein the mole ratio of (a) to (b), known as the "capping ratio," (C.R.) is between about 1:1.5 and about 1:2, for example between about 1:1.6 and about 1:1.8, or between about 1:1.65 and about 1:1.75; wherein further, the at least one chain extender (c) and the at least one amine chain terminator (d) are present in amounts such that the polyurethaneurea, prior to spinning, has an IV less than 1.0 with a primary amine content of between about 25 and about 70 meq/Kg.

The polyether glycols suitable for use in the present invention have number average molecular weights of from about 1500 to about 4000, for example from about 1600 to about 2500, or from about 1800 to about 2000. Useful polyether glycols include, but are not limited to, polyethyleneether glycol, polytrimethyleneether glycol, polytetramethyleneether glycol, polytetramethylene-co-2-methyl-tetramethyleneether glycol, polytetramethylene-co-ethylene glycol, and mixtures thereof. TERATHANE® 1800 (available from Invista S. à r. l.) is an exemplary polytetramethyleneether glycol.

Useful polyester glycols include, but are not limited to, copoly(ethylene-butylene adipate) diol, poly(2,2-dimethylpropylene dodecanoate) diol, hydroxy-terminated reaction products of diols such as ethylene glycol, 1,3-propane diol, 1,4-butane diol, 1,6-hexane diol, 2,2-dimethyl-1,3-propane diol, 3-methyl-1,5-pentane diol, and mixtures thereof.

A mixture of diisocyanates is used to make the polyurethaneurea of the present invention. One component of the diisocyanate mixture is 4,4'-MDI present in at least about 78 mole percent, for example from about 80 to about 95 mole percent, or from about 83 to about 91 mole percent. A second component of the diisocyanate mixture is 2,4'-MDI present in at least about 5 mole percent, for example from about 7 to about 20 mole percent, or from about 9 to about 17 mole percent. It is preferred that there be less than 1 mole percent 2,2'-MDI in the mixture of diisocyanates.

Optionally, other isocyanates could be used in combination with 4,4'-MDI and 2,4'-MDI, such as 2,2'- and 2,4'-toluene-diisocyanate In making the capped glycol, the diisocyanate mixture can be added all at once or in two or more steps and in any order. If desired, dibutyltin dilaurate, stannous octoate, mineral acids, tertiary amines such as triethylamine, N,N'-dimethylpiperazine, and the like, and other known catalysts can be used to assist in the capping step. The capped glycol is then added to a suitable solvent such as DMAc, DMF, DMSO, N-methylpyrrolidinone (NMP), and the like, including mixtures. DMAc is an exemplary solvent.

A single chain extender or a mixture of chain extenders may be used to prepare the polyurethaneurea of the present invention from the capped glycol. Ethylenediamine (EDA) may be used as a single chain extender. If a mixture of chain extenders is used, the mixture may comprise at least about 90 mole percent EDA as a primary chain extender and further include one or more secondary chain extenders. Examples of secondary chain extenders include 2-methyl-1,5-pentanediamine (MPMD, commercially available as DYTEK® A (available from Invista S. à r. l.), 1,2-propanediamine (PDA), 1,3-butanediamine, 1,4-butanediamine, 1,3-diamino-2,2-dimethylbutane, 1,6-hexanediamine, 1,3-propanediamine, N-methylaminobis(3-propylamine) 2-methyl-1,5-pentanediamine, 1,5-diaminopentane, 1,4-cyclohexanediamine, 1,3-diamino-4-methylcyclohexane, 1,3-cyclohexanediamine, 1,1'-methylene-bis(4,4'-diaminohexane), 1,3-diaminopentane, piperazine, cyclohexylene-1,3-diamine(hydrogenated m-phenylene diamine), isophorone diamine, 1,4-diamino-2-methylpiperazine, 1,4-diamino-2,5-dimethylpiperazine, and methyl bispropylamine; and mixtures thereof. Of the secondary chain extenders listed, MPMD and PDA are typical.

Suitable chain terminators include secondary amines, for example diethylamine (DEA), diisopropylamine, piperidine, dibutylamine, and mixtures thereof.

Optionally, a trifunctional "chain brancher" such as diethylenetriamine (DETA) can be used to help control the solution viscosity stability. Low levels of DETA are effective in reducing the rate of increase in solution viscosity while still maintaining desirable fiber properties.

In making the polyurethaneurea of the present invention, the chain extender and chain terminators, and optionally the chain brancher, can be added all at once or in two or more steps. For example, the chain extender(s), chain terminator(s), and optionally the chain brancher may be dissolved in a suitable solvent, as defined above. DMAc is an example of a suitable solvent.

An effective amount of a variety of additives can also be used in the spandex of the invention, provided they do not detract from the beneficial aspects of the invention. Examples include delustrants such as titanium dioxide and stabilizers such as hydrotalcite, mixtures of huntite and hydromagnesite (for example at 0.2 to 5 weight percent based on polyurethaneurea), barium sulfate, hindered phenols, and zinc oxide, dyes and dye enhancers, antimicrobials, antitack agents, silicone oil, hindered amine light stabilizers, UV screeners, and the like.

To realize the benefits of the present invention, the polymer solution which is dry spun into spandex should have a percent solids content greater than 38 and less than 50 weight percent, for example between about 40 and about 48 weight percent, or from about 40 to about 45 weight percent.

One embodiment of the invention is that the intrinsic viscosity of the polyurethaneurea, prior to spinning ("pre-spun IV"), is less than the IV of commercially acceptable spandex fiber. The pre-spun IV should be between about 0.65 and about 1.0 dl/g.

Another embodiment of the invention is that the amount of chain extender ends in the polyurethaneurea solution (expressed as primary amine content), prior to spinning, is about 25 to about 70 meq/Kg.

In an additional embodiment of the invention, the productivity of commercial spandex production can be increased dramatically while simultaneously using less solvent, less gas, and less energy. Additionally, the product is more consistent, as measured by coefficient of denier variation, and generates less waste.

A further embodiment of the invention is spandex fiber which, as-spun, has primary amine content of at least about 5 meq/Kg. The spandex fiber has good dyeability as well as colorfastness. Both of these characteristics are obtained without the effect of standard auxiliary chemical additives such as dye enhancers, for example 0.5 wt. % Methacrol® 2462. While the spandex may contain standard additives, the dyeability and colorfastness are not due to such additives, as comparison to samples with similar loadings of the same additives demonstrates in the Examples. The spandex of the invention is considered "substantially free" of standard additives such as dye enhancers in that the standard loading of applied additives does not lead to the improved dyeability and colorfastness obtained. In other words, the concentration of dye enhancer in the spandex is insufficient to account for the observed improvement as the chemistry of spandex and dye enhancers is presently understood. A spandex of the invention may contain less than 5 wt. % of dye enhancers, for example less than 1 wt. % or less than 0.7 wt. %.

The spandex of the invention can be used alone or in combination with various other fibers in wovens, weft (including flat and circular) knits, warp knits, and personal hygiene apparel such as diapers. The spandex can be bare, covered, or entangled with a companion fiber, for example nylon, polyester, acetate, cotton, and the like.

Yet another embodiment of the invention is the fabrics comprising the spandex of the invention. Fabrics comprising the spandex of the invention may also comprise at least one fiber selected from the group consisting of protein, cellulosic, and synthetic polymer fibers, or a combination of such members. As used herein, "protein fiber" means a fiber composed of protein, including such naturally occurring animal fibers as wool, silk, mohair, cashmere, alpaca, angora, vicuna, camel, and other hair and fur fibers. As used herein, "cellulosic fiber" means a fiber produced from tree or plant materials, including for example cotton, rayon, acetate, lyocell, linen, ramie, and other vegetable fibers. As used herein, "synthetic polymer fiber" means a manufactured fiber produced from a polymer built up from chemical elements or compounds, including for example polyester, polyamide, acrylic, spandex, polyolefin, and aramid. The dyeability and colorfastness of the spandex reduce the amount of undesirable "grin through" which spandex may exhibit when combined with other fibers.

Fabrics comprising spandex may have a spandex content of about 0.5 weight percent (wt. %) to about 40 wt. %, based on weight of the fabric. For example, woven fabrics comprising spandex may contain from about 0.5 wt. % to about 40 wt. % spandex, circular knits comprising spandex may contain from about 2 wt. % to about 25 wt. % spandex, legwear comprising spandex may contain from about 1 wt. % to about 40 wt. % spandex, raschel fabric comprising spandex may contain from about 10 wt. % to about 40 wt. % spandex, and warp knit tricots comprising spandex may contain from about 14 wt. % to about 22 wt. % spandex. For a warp knit tricot fabric, fabric recovery force at 50% extension in the warp direction may be from about 0.2 Kg to about 0.5 Kg.

The spandex or the fabric comprising it may be dyed and printed by customary dyeing and printing procedures, such as from an aqueous dye liquor by the exhaust method at temperatures between 20° C. and 130° C., by padding the material comprising the spandex with dye liquors, or by spraying the material comprising the spandex with dye liquor.

Conventional methods may be followed when using an acid dye. For example, in an exhaust dyeing method, the fabric can be introduced into an aqueous dye bath having a pH of between 3 and 9 which is then heated steadily from a temperature of approximately 20° C. to a temperature in the range of 40-130° C. over the course of about 10-80 minutes. The dye bath and fabric are then held at temperature in the range of 40-130° C. for from 10-60 minutes before cooling. Unfixed dye is then rinsed from the fabric. Stretch and recovery properties of the spandex are best maintained by minimal exposure time at temperatures above 110° C.

High color yields, color strength, and a degree of levelness can be obtained for the spandex or the fabric comprising it when dyed with non-metalized acid levelling dyes (relative molecular mass 250-950) applied under acidic to slightly alkaline conditions, pre-metalized dyes containing a metal atom, for example chromium or cobalt, applied under acidic to slightly alkaline conditions, and reactive dyes applied under acidic or neutral to slightly alkaline conditions of pH 4-9 in exhaust or pad applications. Generally, the spandex of the invention may be dyed with reactive dyes that are conventionally used to dye polyamide or wool yarns containing amine end groups. Direct dyes may be applied under acidic to neutral dyeing conditions.

The washfastness properties of the spandex may be supported and further enhanced by use of customary auxiliary chemical additives. Anionic syntans may be used to improve the wetfastness characteristics, and can also be used as retarding and blocking agents when a minimal partition of dye is required between the spandex and partner yarn. Anionic sulfonated oil is an auxiliary additive used to retard anionic dyes from spandex or partner fibers that have a stronger affinity for the dye where uniform level dyeing is required. Cationic fixing agents can be used alone or in conjunction with anionic fixing agents to support improved washfastness.

An additional embodiment of the invention is the garments comprising fabric which comprises the spandex of the invention. By "garment" is meant an item of clothing such as a jacket, coat, shirt, skirt, pair of pants, sportswear, swimsuit, bra, socks or underwear, and also includes accessories such as belts, gloves, mittens, hats, hosiery, or footwear.

The following examples demonstrate high-solids, high-productivity spinning of spandex. Additional examples demonstrate the characteristics of the spandex fiber, and the characteristics of fabrics comprising the spandex fiber. These examples are intended to be illustrative of the present invention. Other objects and advantages of the present invention will become apparent to those skilled in the art. As will be realized, the invention is capable of other and different embodiments, and its several details are capable of modifications in various apparent respects, without departing from the scope and spirit of the invention. Accordingly, the examples are to be regarded as illustrative in nature and not as restrictive.

EXAMPLES

Preparation of Polyurethaneurea

The polyurethaneurea polymers in the examples were prepared according to the following general method. A stoichiometric excess of the diisocyanate mixture was mixed with a polymeric glycol and heated to approximately 90° C. for 2 hours. The resulting capped glycol mixture contained isocyanate terminated polymeric glycol and residual unreacted diisocyanate. The reaction was allowed to continue until the measured weight percent isocyanate (% NCO) was in close agreement with theoretical values based on reaction of all glycol hydroxyl groups with isocyanate. The resulting capped glycol was then completely dissolved in DMAc at about 45° C. under high shear. The capped glycol solution was contacted, under high shear, with a DMAc solution containing the appropriate chain extender(s) and chain terminator(s). The resulting polymer solution was analyzed for weight percent solids, concentration of chain extender ends, primary amine content, and pre-spun intrinsic viscosity. Some polymer solutions were also analyzed for 40° C. falling ball viscosity. An additive solution was added to provide the final fiber with 1.5 weight percent CYANOX® 1790 (1,3,5-tris(4-t-butyl-3-hydroxy-2,6-dimethyl-benzyl)-1,3,5-triazine-2,4,6-(1H,3H,5H)trione, available from Cytec Industries), 0.5 weight percent METHACROL® 2462 (available from E.I. DuPont de Nemours and Company), and 0.6 weight percent polydimethylsiloxane silicone oil. For some examples, 0.3 wt % titanium dioxide (TiPure Type R706, available from E.I. DuPont de Nemours and Company) and 4.0 wt % of a physical mixture of huntite and hydromagnesite mineral particles (available from Minelco Specialties Ltd.), as described in U.S. Pat. No. 5,626,960 (hereby incorporated by reference), were also added. The polymer solution was then dry spun from DMAc into a column into which a stream of heated nitrogen was introduced. The resulting spandex filaments were coalesced, a spin finish was applied, and the fiber was wound onto a package.

The diisocyanate mixtures used in the examples were prepared by mixing ISONATE® MDR (Dow Chemical Co.) and MONDUR® ML (Bayer AG) or Lupranate® Ml (BASF Corporation) in appropriate proportions to obtain the desired levels of 2,4'-MDI. ISONATE® MDR is 4,4'-MDI containing a small amount of 2,4'-MDI (approx. 1.9%). MONDUR® ML is a mixture of 4,4'-MDI (approx. 53.2%), 2,4'-MDI (approx. 44.9%) and 2,2'-MDI (approx. 2.2%). Lupranate® Ml is a mixture of 4,4'-MDI (approx. 51.2%), 2,4'-MDI (approx. 47.4%), and 2,2'-MDI (approx. 1.4%).

The polyether glycol used in the examples was TERATHANE® 1 800 (Invista S. à r. l.) a polytetramethyleneether glycol having a number average molecular weight of 1800. The chain extender was either EDA or a mixture of EDA and MPMD (DYTEK® A, available from Invista S. à r. l.).

Analytical Methods

Concentrations of the MDI isomers in the starting materials were determined by gas chromatographic analyses using a 15-meter DB-1701 capillary column, programmed from 150-230° C. at 8 degrees/min following an initial hold time of 2 min.

Intrinsic viscosity (IV) of the polyurethaneurea was determined by comparing the viscosity of a dilute solution of the polymer in DMAc to that of DMAc itself at 25° C. ("relative viscosity" method) in a standard Cannon-Fenske viscometer tube according to ASTM D2515 and is reported as dl/g. Intrinsic viscosity of the spun yarn was determined similarly after removing finish from the yarn.

Solids analysis was performed on polymer solution comprising polyurethaneurea using a microwave solids analyzer (CEM AVC 80). Sample size was 2-3 grams.

The number of chain extender ends (CE) was determined by diluting the polymer solution in DMAc followed by potentiometric titration for amine content. This method determines total amine ends in solution, some of which are on the polymer chain and some of which are free primary and secondary amines in solution.

The number of polymer chain primary amine ends was determined by dissolving a sample of the polymer film in DMAc and titrating for primary amine content with methanesulfonic acid using Bromophenol Blue as indicator. In the Tables, "primary amine ends" is abbreviated as "PAE's."

The number of primary amine ends in "as-spun" yarn was determined by soaking a yarn sample in acetone for 4 hours at room temperature to remove finish, allowing the yarn to air dry overnight at ambient temperature, cutting the yarn into pieces approximately 0.25 inches (0.64 cm) in length, then dissolving the yarn in DMAc and titrating for primary amine content with methanesulfonic acid using Bromophenol Blue as indicator.

The number of primary amine ends in "boiled-off" yarn was determined similarly, except that the dried finish-free yarn was placed in boiling water for 30 minutes and allowed to air dry overnight before being cut into pieces and treated as described above.

The number of polymer chain diethyl urea (DEU) ends was calculated according to the following equation:

$$A = B * Eq_{NCO}/Eq_A$$

where
A is the concentration of dialkylurea polymer end groups in meq/Kg of polymer,
B is the total concentration of dialkyl amine chain terminator(s) added in the polymer recipe in meq/Kg of polymer,
$Eq_{NCO}$ is the equivalents of isocyanate in the capped glycol in the polymer recipe, and
$Eq_A$ is the sum total of equivalents of amines in the polymer recipe, as further defined below.

Quantity B was calculated as follows:

$$B = \Sigma[(wt_{term} * 1 \ eq/mol * 1000 \ meq/eq)/MW_{term}/wt_{total}]$$

where
$wt_{term}$ is the weight in grams of the chain terminator added,
$MW_{term}$ is the molecular weight in grams per mole of the chain terminator added, and
$wt_{total}$ is the total weight in kilograms of polymer ingredients excluding solvent.

Quantity $Eq_{NCO}$ was calculated as follows:

$$Eq_{NCO} = wt_{CG} * (\% \ NCO/100) * 1 \ eq/mol/MW_{NCO}$$

where
$wt_{CG}$ is the weight in grams of capped glycol,
% NCO is the percent isocyanate of the capped glycol, and
$MW_{NCO}$ is the molecular weight of NCO in grams per mole.

Quantity $Eq_A$ was calculated as follows:

$$Eq_A = \Sigma(wt_A * eq/mol_A/MW_A)$$

where
$wt_A$ is the weight in grams of the amine added,
$eq/mol_A$ is the number of amine equivalents per mole of the amine added, and
$MW_A$ is the molecular weight in grams per mole of the amine added.

Adding together the number of polymer chain primary amine ends and the number of polymer chain diethyl urea ends determines the number of total polymer chain ends. This does not include a relatively small number of unreactive polymer ends ("dead ends"), or those few urea and/or amine ends that may come from the amine impurities present in the solvent.

To measure coefficient of denier variation (CDV), the first 50 meters of fiber at the surface of a wound spandex package were removed so that inaccuracies resulting from handling damage were avoided. Spandex was then removed for 130 seconds from the package using a rolling take-off and fed across a tensiometer comprising a piezoelectric ceramic pin. The take-up roll's circumference was 50% greater than the feed roll's circumference, and the feed and take-up rolls rotated at the same rpm, so that the polyurethane fiber was stretched to 50% elongation across the tensiometer. The tensiometer measured the tension as the spandex was fed through the rolls. The standard deviation of the tension was divided by the average tension to obtain the coefficient of variation since denier is directly proportional to the tension. CDV is independent of the linear density units used (denier vs. decitex), and low CDV indicates high fiber uniformity.

Percent isocyanate (% NCO) of the capped glycols was determined according to the method of S. Siggia, "Quantitative Organic Analysis via Functional Group", 3rd Edition, Wiley & Sons, New York, pages 559-561 (1963) using a potentiometric titration.

The strength and elastic properties of the spandex were measured in accordance with the general method of ASTM D 2731-72. Three filaments, a 2-inch (5-cm) gauge length and zero-to-300% elongation cycles were used for each of the measurements "as-is" from the windup, that is, without scouring or other treatment, after 24 hours of aging at approximately 70° F. and 65% relative humidity (±2%) in a controlled environment. The samples were cycled five times at a constant elongation rate of 50 cm per minute and then held at 300% extension for 30 seconds after the fifth extension. Load power, the stress on spandex during initial extension, was measured on the first cycle at 200% extension and is reported in the Tables in grams and designated "LP". Unload power, the stress at an extension of 200% on the fifth unload cycle, is also reported in grams; it is designated as "UP". Percent elongation at break ("Eb") and tenacity were measured on the sixth extension cycle using modified Instron grips to which a rubber tape was attached for reduced slippage. Percent set was also measured on samples that had been subjected to five 0-300% elongation/relaxation cycles. Percent set ("% SET") was calculated as:

$$\% \ SET = 100(Lf - Lo)/Lo$$

wherein Lo and Lf are the filament (yarn) length, when held straight without tension, before and after the five elongation/relaxation cycles, respectively.

Polyurethaneurea solution viscosity was determined in accordance with the general method of ASTM D1343-69 with a Model DV-8 Falling Ball Viscometer (Duratech Corp., Waynesboro, Va.), operated at 40° C. and is reported in poises. The highest solution viscosity that could be measured using this instrument was 35,000 poises.

Spandex fiber whiteness retention was assessed by determining the amount of discoloration produced upon exposure of the fiber to heat, ultraviolet light, combustion fumes, or $NO_2$ fumes. In preparation for determining the effect of these environmental factors on the spandex, the fiber was wound under low tension on 8 cm×11 cm×0.2 cm aluminum cards to form a layer 3-4 millimeters thick. The wound cards were immersed in water containing 1.5 g/l of Supralate® EP (a sulfate detergent sold by Witco Corp.) and 1.5 g/l of sodium pyrophosphate, and the bath was heated to boiling for 30 minutes (scour). The cards were then rinsed with deionized water and allowed to air dry overnight.

Fiber discoloration is usually manifested in an undesirable increase in yellowness, so the Hunter "b" scale (yellownessblueness) values of the fiber on the cards were measured with a SpectraFlash® Colorimeter Model SF-300 (available from Datacolor International, calibrated against the manufacturer's standard reference plates) and recorded as the initial "b-value". The effects of all exposure tests were determined by means of measurements of the amount of discoloration undergone by the test samples as a result of the exposure. Discoloration was measured as a change in "b" value (i.e., "Δb") by means of differential colorimetry. Samples were exposed as described below until the Δb value was between 2 and 12; this amount of change typically required samples to undergo at least 2 or 3 cycles of exposure. Control samples were treated similarly. Low values of Δb indicate that the test generated little discoloration in the fiber.

Thermal degradation tests (labeled "thermal" in the table below) were performed in an oven in which the samples were exposed to air at 190° C. for 15 minute cycles. For exposure to ultraviolet light (labeled "UV" in the table below), tests were conducted in an Atlas Series C "Weather-ometer", made by Atlas Electric Devices Co. of Chicago, Ill. In the Weatherometer, samples are exposed for 3 hour cycles to a xenon light having a spectrum resembling that of sunlight. Tests in which samples were exposed to combustion fumes (labeled "fume" in the table below) were conducted similarly to Test Method 23-1962 of AATCC (American Association of Textile Chemists and Colorists) using a Model 8727 atmospheric fume chamber made by United States Testing Company, Inc. The chamber was supplied with combustion fumes generated by burning propane (Roberts Oxygen Co, Inc.) with a Bunsen burner adjusted to give a predominantly blue flame. The flame height was such that the temperature in the chamber was kept between 57 and 63° C. Sample exposure duration was 18 hours per cycle. For exposure to $NO_2$ gas (labeled "$NO_2$" in the table below), was used. The temperature and relative humidity were allowed to remain at or near room conditions, and samples were exposed for 9 hours per cycle. The chamber was supplied with air containing approximately 1000 ppm of $NO_2$ at a rate of approximately 3 liters/minutes.

To measure heat-set efficiency, the yarn samples were mounted on a 10-cm frame and stretched 1.5×. The frame (with sample) was placed horizontally in an oven preheated to 190° C. for 120 seconds. The samples were allowed to relax and the frame to cool to room temperature. The samples (still on the frame and relaxed) were then immersed in a boiling de-mineralized water for 30 minutes. The frame and samples were removed from the bath and allowed to dry. The length of the yarn samples was measured and heat set efficiency (HSE, as a percentage) was calculated according to the following formula:

$$\% \, HSE = \frac{(\text{heat set length} - \text{original length})}{(\text{stretched length} - \text{original length})} \times 100$$

A spandex heat-set efficiency of at least about 85% at 175° C. is needed for use with fabrics containing spandex and cotton or wool. Similar heat-set efficiency can be achieved at 190° C. for use with hard fibers such as nylon.

Hot-wet creep (HWC) is determined by measuring an original length, $L_o$, of a yarn, stretching it to one-and-a-half times its original length (1.5 $L_o$), immersing it in its stretched condition for 30 minutes in a water bath maintained at temperature in the range of 97 to 100° C., removing it from the bath, releasing the tension and allowing the sample to relax at room temperature for a minimum of 60 minutes before measuring the final length, $L_f$. The percent hot-wet creep is calculated from the formula:

$$\% \, HWC = 100 \times [(L_f - L_o)/L_o]$$

Fibers with low % HWC provide superior performance in hot-wet finishing operations, such as dyeing.

To measure the resistance of spandex to chlorine-induced degradation, a 9-cm long loop of 44-dtex, 4-coalesced-filament spandex was subjected to the tension imposed by a 10 gram weight suspended from the loop and then exposed to water containing 3.5 ppm of active chlorine at 25° C. and adjusted to pH 7.5. The chlorine level and pH were automatically monitored and adjusted during the test by adding dilute NaClO, HCl, or NaOH solutions as needed. (The sample was tested as-spun, without having been heat-set, scoured, etc.) Prior to exposure, urea was added so that the bath contained 2 ppm urea. To replace evaporative loss of water and reactive loss of urea during the test, 90 ml of an aqueous 7 ppm urea solution was added to the bath at hourly intervals via a pump with a timer. The hours of exposure were measured until the sample broke. Six specimens were tested for each sample.

To determine the heat set temperature for fabric stability, several fabric samples were prepared as described in the Examples and heat set at 365° F. (185° C.), 375° F. (190° C.), and 385° F. (196° C.). For each heat-set fabric, the fabric edge curl test was performed as follows. A sample 10 cm by 10 cm was cut 'square' from the fabric so that its sides were parallel with either the courses or the wales of the fabric as appropriate, and its center point was marked with a pen. A ruler was laid down between opposing corners of the square sample, and a letter "X" was drawn on the fabric so that the intersection of its lines was at the marked center point. Each line of the "X" was 5 cm long, and it was oriented so that each line coincided with an imaginary line connecting diagonally opposing corners of the fabric sample. The fabric was carefully cut along each line of the "X", and the amounts of curl of the resulting four points of the fabric (two each representing the width and length directions) were noted after two hours according to whether the point made 0 turn, ¼ turn, ½ turn, ¾ turn, or 1 turn during the allotted time. "1 Turn" means that the fabric point completed a 360° revolution when viewed parallel to the plane of the sample. The average of the turns for two opposite points on the "X" cut was recorded for each sample. A turn of 1 or less is considered to represent an acceptable amount of curl.

The method for determining fabric weight was based on the ANSI/ASTM D-1910 Standard Test Method for Construction Characteristics of Fabrics. Fabric samples were die-punched with a 10 cm diameter die. Each cut-out fabric sample was weighed in grams. The "fabric weight" was then calculated as grams/square meters.

The spandex content in a warp knit fabric was determined by the following equation:

[(SR×SD/TBE)]/[(SR×SD/TBE)+(CYR×CYD)]

where
SR is spandex runner length,
SD is spandex denier,
TBE is total beam elongation and is defined as [(1+% tube stretch)×(1+% beam stretch)],
CYR is companion yarn runner length, and
CYD is companion yarn denier.

To determine fabric recovery force (unload power), three specimens of 3 in×8 in (7.6 cm×20.3 cm) were cut from the fabric and folded in the middle to form an open loop. The long dimension of each specimen was tested. Unload Power was tested in the machine-direction. Each open loop was stitched together about 1 inch (2.5 cm) from its ends to form a closed loop 6 inches (15.2 cm) in circumference. The fabric loops were tested with an Instron tensile tester with a 6-inch (15.2 cm) cross head, pneumatic clamps (size 3C, having 1 in×3 in (2.5×7.6 cm) flat faces, 80 psi (552 kPa) air supply, and 10 inches per minute (25.4 cm/min) chart speed. A u-shaped rod was clamped sideways between one of the sets of clamps of the tensile tester so that the ends of the rod (2.78 in (7 cm) between the ends, 3 in (7.6 cm) around the ends) projected from the clamps far enough to hold the fabric loop securely. The loop was placed around the projecting rod ends and stretched to a 12-pound (5.4 Kg) force and relaxed; the cycle was performed a total of 3 times. "Fabric stretch" was measured on the 3rd cycle extension at 12-pound (5.4 Kg) force, and unload power was measured at 50% remaining available stretch on the 3rd cycle relaxation and reported in kilograms (Kg). "50% remaining available stretch" means that the fabric had been relaxed 50% from the 12-pound (5.4 Kg) force on the 3rd cycle.

In the Tables, "ND" means "not determined."

Example 1

A polyurethaneurea polymer typically used to make spandex was prepared using TERATHANE® 1800 and ISONATE® MDR with a capping ratio of 1:1.69. The capped glycol had a % NCO of 2.6% and was diluted with DMAc to give a 45 percent solids solution. This solution was then contacted with a DMAc solution containing: a chain extending mixture of EDA and DYTEK® A (90/10 mole ratio); and diethylamine as a chain terminator, in proportions such that the resulting polymer solution had an intrinsic viscosity of 0.95, an initial solution viscosity of 2600 poises and was 34.8 percent solids with the number of chain extender ends measured to be 15 meq/Kg of polymer solids. A 40 denier, 3 filament spandex yarn was spun from polymer solution at 950 yards per minute (ypm) (869 meters per minute, m/min). Intrinsic viscosity of the spun yarn was 1.16.

Example 2

A polyurethaneurea polymer was prepared using a diisocyanate mixture containing 82% ISONATE® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity of 0.75, and an initial solution viscosity of 3300 poise and was 45 percent solids with the number of chain extender ends measured to be 40 meq/Kg of polymer solids. A 40 denier, 3 filament spandex yarn was spun from polymer solution at 950 ypm (869 m/min). Intrinsic viscosity of the spun yarn was 1.34.

Example 3

A polyurethaneurea polymer was prepared using a diisocyanate mixture containing 82% ISONATE® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity (calculated) of approximately 0.95 (total ends approx. 55), with the number of chain extender ends measured to be 15 meq/Kg of polymer solids. A 45% solids polymer solution could not be spun into fiber due to the high viscosity and gelling.

Example 4

A polyurethaneurea polymer typically used to make spandex was prepared using TERATHANE® 1800 and ISONATE® MDR with a capping ratio of 1:1.69. The capped glycol had a % NCO of 2.6% and was diluted with DMAc to give a 55 percent solids solution of the capped glycol. This solution was then contacted with a DMAc solution containing: ethylenediamine chain extender; and diethylamine as a chain terminator, in proportions such that the resulting polymer solution had 45 percent solids with the number of chain extender ends measured to be 40 meq/Kg of polymer solids. The solution was highly unstable. The 40° C. falling ball viscosity increased over 10,000 poise in one hour. The intrinsic viscosity could not be measured and the polymer could not be spun.

TABLE 1

| | Example | | | |
|---|---|---|---|---|
| | 1 | 2 | 3 | 4 |
| % 2,4'-MDI | 1.9 | 11.1 | 11.1 | 1.9 |
| C.R. | 1:1.69 | 1:1.69 | 1:1.69 | 1:1.69 |
| % Solids | 34.8 | 45 | 45 | 45 |
| Pre-spun IV | 0.95 | 0.75 | 0.95 Calculated | Not measurable |
| CE | 15 | 40 | 15 | 40 |
| Solution Viscosity (as made) | 2600 | 3200 | Not measurable | Not measurable |
| Fiber IV | 1.16 | 1.34 | Not measurable | Not measurable |
| Tenacity | 41.6 | 43.5 | — | — |
| LP | 6.9 | 5.4 | — | — |
| UP | 1.14 | 1.11 | — | — |
| CDV | 17.8 | 10.3 | — | — |
| Eb | 476 | 468 | — | — |

A comparison of Example 1 to Example 4 shows that merely adjusting the chain extender ends to the desirable level, without also controlling the diisocyanate balance, does not provide a high-solids polymer solution that can be used to prepare spandex.

A comparison of Example 2 to Example 3 shows that having the desirable diisocyanate balance, but without the proper pre-spun IV and without the proper number of chain extender ends, results in a high viscosity polymer solution that cannot be spun into spandex.

Example 5

The polyurethaneurea polymer of Example 1 was used to make a 40 denier, two filament spandex yarn and was spun from polymer solution at 672 ypm (614 m/min). The fiber properties are reported in Table 2.

Example 6

The polyurethaneurea polymer of Example 2 was used to make a 40 denier, two filament spandex yarn and was spun from polymer solution at 672 ypm (614 m/min). The fiber properties are reported in Table 2.

Example 7

The polyurethaneurea polymer of Example 2 was used to make a 40 denier, two filament spandex yarn and was spun from polymer solution at 807 ypm (738 m/min). The fiber properties are reported in Table 2.

TABLE 2

|  | Example | | |
| --- | --- | --- | --- |
|  | 5 | 6 | 7 |
| % 2,4'-MDI | 1.9 | 11.1 | 11.1 |
| C.R. | 1:1.69 | 1:1.69 | 1:1.69 |
| % Solids | 34.8 | 45 | 45 |
| Pre-spun IV | 0.95 | 0.75 | 0.75 |
| CE | 15 | 40 | 40 |
| Solution Viscosity (as made) | 2600 | 3200 | 3200 |
| Spin rate (ypm) | 672 | 672 | 807 |
| Fiber IV | 1.4 | 1.6 | 1.43 |
| Tenacity | 54.6 | 41.6 | 45.4 |
| LP | 5.27 | 4.10 | 4.32 |
| UP | 1.15 | 1.00 | 1.01 |
| CDV | 21 | 9.5 | 9.8 |
| Eb | 546 | 556 | 513 |

Table 2 demonstrates that Examples 6 and 7 provide high-solids polymer solutions that can be used to prepare commercially acceptable spandex with even greater consistency (lower CDV) than with the system of Example 5.

Example 7 further illustrates that spandex can be prepared at higher winding speeds, thus greater productivity, than using other systems. Note that commercially acceptable spandex was prepared at 807 ypm (738 m/min) in Example 7 whereas spandex of Example 5 was spun at 672 ypm (614 m/min) without achieving commercially acceptable properties (Example 5 CDV>15). The process of Example 5 would have to be operated at still lower speeds to achieve acceptable spandex properties.

Example 8

A polyurethaneurea polymer was prepared using a diisocyanate mixture containing 2% 2,4-MDI and 98% 4,4'-MDI. (In the Examples, each MDI isomer is reported as mole percent of the total diisocyanate mixture.) The capped glycol was prepared using TERATHANE® 1800 with a capping ratio of 1:1.69. The capped glycol was diluted with DMAc and then contacted with a DMAc solution containing a chain extending mixture of EDA and DYTEK® A (90/10 mole ratio), DEA as a chain terminator, and DETA in proportions such that the resulting polymer solution had an intrinsic viscosity of 0.98 dl/g, an initial solution viscosity of 2900 poise, and was 35% solids. Additional data for the polymer sample is included in Table 3. The number of chain extender ends was measured to be 15 meq/Kg of polymer solids.

A polyurethaneurea film was cast according to the following procedure. Polymer solution was placed on Mylar(R) film which had been fixed to a flat surface, and a 0.005-0.015 inch film was cast with a film knife. The Mylar® film which was coated with the polyurethaneurea film was then removed from the flat surface and placed in a film drying box, where it was dried under nitrogen flow at 20-25° C. for a minimum of 16-18 hours. During the drying process, free amines (those not chemically bound to the polymer) evaporated from the polyurethaneurea film. The polyurethaneurea film was found to have 13.5 meq/Kg polymer chain primary amine ends and was calculated to have 39.0 meq/Kg polymer chain diethyl urea ends.

A 40 denier, 3 filament spandex yarn was spun from the polymer solution at 923 ypm (844 m/min). Intrinsic viscosity of the spun yarn was 1.31 dl/g. As-spun primary amine ends, tenacity, and other characteristic values for the spun yarn are presented in Table 4. Table 5 contains chlorine resistance data for the spun yarn.

Example 9

A polyurethaneurea polymer was prepared as in Example 8 but with the following differences. The polymer solution had an intrinsic viscosity of 0.96 dl/g, an initial solution viscosity of 3270 poise, and was 34.8% solids. Intrinsic viscosity of the spun yarn, which had 0.3 wt % TiO$_2$ and 4.0 wt % of a physical mixture of huntite and hydromagnesite mineral particles as additives, was 1.30 dl/g. Additional data for the polymer is given in Table 3. Tenacity and other characteristic values for the spun yarn are presented in Table 4. Table 5 contains chlorine resistance data for the spun yarn.

Example 10

A polyurethaneurea polymer was prepared using a diisocyanate mixture containing 12.8% 2,4'-MDI and 87.2% 4,4'-MDI. The capped glycol was prepared using TERATHANE® 1800 with a capping ratio of 1:1.70. The capped glycol was diluted with DMAc and then contacted with a DMAc solution containing EDA, DEA, and DETA in proportions such that the resulting polymer solution had an intrinsic viscosity of 0.78 dl/g, an initial solution viscosity of 2900 poise and was 45% solids. Additional data for the polymer sample is included in Table 3. The number of chain extender ends was measured to be 40 meq/Kg of polymer solids. A polyurethaneurea film cast from this polymer solution was found to have 34.2 meq/Kg polymer chain primary amine ends and was calculated to have 48.8 meq/Kg polymer chain diethyl urea ends.

A 40 denier, 3 filament spandex yarn was spun from the polymer solution at 923 ypm (844 m/min). Intrinsic viscosity of the spun yarn was 1.04 dl/g. Additional data for the spun yarn is included in Tables 4 and 5.

Example 11

A polyurethaneurea polymer of this invention was prepared as in Example 10 except that the resulting polymer solution had an intrinsic viscosity of 0.88 dl/g, and was 40% solids. Additional data for the polymer sample is included in Table 3. The number of chain extender ends was measured to be 30 meq/Kg of polymer solids. A polyurethaneurea film cast from this polymer solution was found to have 26.6 meq/Kg polymer chain primary amine ends and was calculated to have 38.2 meq/Kg polymer chain diethyl urea ends.

A 40 denier, 3 filament spandex yarn was spun from the polymer solution at 923 ypm (844 m/min). Intrinsic viscosity of the spun yarn was 1.23 dl/g. Additional data for this sample is included in Table 4.

Example 12

A polyurethaneurea polymer of this invention was prepared as in Example 11. The number of chain extender ends was measured to be 30 meq/Kg of polymer solids. A polyurethaneurea film cast from this polymer solution was found to have 26.7 meq/Kg polymer chain primary amine ends and was calculated to have 38.2 meq/Kg polymer chain diethyl urea ends. A 40 denier, 3 filament spandex yarn was spun from the polymer solution at 923 ypm (844 m/min). Intrinsic viscosity of the spun yarn was 1.15 dl/g. Additional data for this sample is included in Tables 3 and 4.

Example 13

A polyurethaneurea polymer of this invention was prepared as in Example 11. The number of chain extender ends was measured to be 30 meq/Kg of polymer solids. A polyurethaneurea film cast from this polymer solution was found to have 26.8 meq/Kg polymer chain primary amine ends and was calculated to have 38.2 meq/Kg polymer chain diethyl urea ends. A 40 denier, 3 filament spandex yarn was spun from the polymer solution at 923 ypm (844 m/min). Intrinsic viscosity of the spun yarn was 1.23 dl/g. Additional data for this sample is included in Tables 3 and 4. Table 5 contains chlorine resistance data for the spun yarn.

Example 14

A polyurethaneurea polymer was prepared as in Example 13 but with 0.1 wt % $TiO_2$ and 4.0 wt % of a physical mixture of huntite and hydromagnesite mineral particles as additives. Properties for the polymer and the spun yarn are reported in Tables 3, 4, and 5.

Example 15

A polyurethaneurea polymer of this invention was prepared as in Example 11. The number of chain extender ends was measured to be 50 meq/Kg of polymer solids. A polyurethaneurea film cast from this polymer solution was found to have 44.7 meq/Kg polymer chain primary amine ends and was calculated to have 20.4 meq/Kg polymer chain diethyl urea ends. A 40 denier, 3 filament spandex yarn was spun from the polymer solution at 923 ypm (844 m/min). Intrinsic viscosity of the spun yarn was 1.02 dl/g. Additional data for this sample is included in Tables 3, 4, and 5.

Example 16

A polyurethaneurea polymer was prepared as in Example 15 but with 0.1 wt. % $TiO_2$, 4.0 wt. % of a physical mixture of huntite and hydromagnesite mineral particles, and 0.5 wt. Of an additive comprising at least one mono-hindered hydroxyphenyl group and having a molecular weight of at least about 300 Daltons as additives. Polymer and yarn properties are reported in Tables 3 and 4. Chlorine resistance data for the spun yarn is presented in Table 5.

Example 17

A polyurethaneurea polymer of this invention was prepared as in Example 15. The pre-spun polymer intrinsic viscosity was 0.88 dl/g, and the solution solids was 39%. The number of chain extender ends was measured to be 50 meq/Kg of polymer solids. A polyurethaneurea film cast from this polymer solution was found to have 36.0 meq/Kg polymer chain primary amine ends and was calculated to have 31.4 meq/Kg polymer chain diethyl urea ends. A 40 denier, 3 filament spandex yarn was spun from the polymer solution at 923 ypm (844 m/min). Intrinsic viscosity of the spun yarn was 1.14 dl/g. Additional data for this sample is included in Tables 3 and 4. This sample contained 0.3% by weight (based on polymer solids) of $TiO_2$ and 0.25% by weight (based on polymer solids) of polymer solids of N,N-ethylene bis-stearamide antitack (available from Crompton Corp. as Kemamide® W40-300).

TABLE 3

| | Example | | | | | | | | | |
|---|---|---|---|---|---|---|---|---|---|---|
| | 8 | 9 | 10 | 11 | 12 | 13 | 14 | 15 | 16 | 17 |
| % 2,4'-MDI | 2.0 | 2.0 | 12.8 | 12.8 | 12.8 | 12.8 | 12.8 | 12.8 | 12.8 | 12.8 |
| C.R. | 1:1.69 | 1:1.69 | 1:1.70 | 1:1.70 | 1:1.70 | 1:1.70 | 1:1.70 | 1:1.70 | 1:1.70 | 1:1.70 |
| % Solids | 35 | 35 | 45 | 40 | 40 | 40 | 40 | 40 | 40 | 39 |
| DETA (ppm) | 225 | 225 | 250 | 150 | 100 | 20 | 20 | 20 | 20 | 50 |
| Pre-Spun IV | 0.98 | 0.96 | 0.78 | 0.88 | 0.88 | 0.86 | 0.86 | 0.86 | 0.89 | 0.88 |
| CE | 15 | 15 | 40 | 30 | 30 | 30 | 30 | 50 | 50 | 50 |
| Polymer Chain PAE's | 13.5 | 13.5 | 34.2 | 26.6 | 26.7 | 26.8 | 26.8 | 44.7 | 44.7 | 36.0 |
| Polymer Chain DEU Ends | 39.0 | 39.0 | 48.8 | 38.2 | 38.2 | 38.2 | 38.2 | 20.4 | 20.4 | 31.4 |
| Total Polymer Chain Ends | 52.5 | 52.5 | 83.0 | 64.8 | 64.9 | 65.0 | 65.0 | 65.1 | 65.1 | 65.0 |

Notes:
DEU values are calculated. DETA amounts are given as ppm in polymer.

TABLE 4

| | Example | | | | | | | | | |
|---|---|---|---|---|---|---|---|---|---|---|
| | 8 | 9 | 10 | 11 | 12 | 13 | 14 | 15 | 16 | 17 |
| As-Spun Yarn PAE's | 2.1 | 2.3 | ND | ND | ND | 3.1 | 3.4 | 21.2 | 16.3 | 11.7 |
| Boiled-Off Yarn PAE's | 1.4 | 3.1 | ND | ND | ND | 1.0 | 3.0 | 16.5 | 14.1 | 7.57 |
| Fiber IV | 1.31 | 1.30 | 1.04 | 1.23 | 1.15 | 1.23 | 1.25 | 1.02 | 1.09 | 1.14 |
| Tenacity | 41.1 | 41.4 | 45.6 | 48.9 | 49.6 | 49.1 | 42.6 | 44.0 | 40.7 | 44.5 |
| LP | 6.72 | 6.47 | 5.83 | 6.03 | 5.71 | 5.24 | 4.95 | 5.14 | 4.84 | 5.91 |
| UP | 1.10 | 1.08 | 1.08 | 1.16 | 1.15 | 1.15 | 1.11 | 1.09 | 1.03 | 1.16 |
| CDV | 18.3 | 10.4 | 10.7 | 11.0 | 10.7 | 11.1 | 12.1 | 10.2 | 11.5 | 9.0 |
| % Eb | 490 | 477 | 475 | 466 | 472 | 465 | 456 | 487 | 475 | 456 |
| Thermal Δb | 7.4 | ND | ND | ND | ND | 11.6 | ND | 6.8 | ND | ND |
| UV Δb | 8.0 | ND | ND | ND | ND | 7.2 | ND | 5.1 | ND | ND |
| fume Δb | 3.2 | ND | ND | ND | ND | 2.6 | ND | 3.6 | ND | ND |
| $NO_2$ Δb | 2.5 | ND | ND | ND | ND | 2.0 | ND | 2.8 | ND | ND |
| % HSE at 190° C. | 80.3 | ND | 84.0 | ND | ND | 86.3 | ND | 86.2 | ND | ND |
| % HWC | 17.6 | ND | ND | ND | ND | 16.4 | ND | 20.6 | ND | ND |
| UP after HWC | 0.84 | ND | ND | ND | ND | 1.10 | ND | 1.03 | ND | ND |

Note: Tenacity is given in grams.

Data in Table 4 show by similarity to the results for Example 8 that the spandex yarn of the invention resists fiber yellowing from exposure to heat, ultra-violet light, combustion fumes, and $NO_2$ fumes. The fibers' heat-set efficiency is excellent. Hot-wet creep and unload power after exposure to hot-wet creep conditions are commercially acceptable. The samples have good CDV values, showing that the along end fiber uniformity is acceptable.

TABLE 5

Chlorine Resistance Data (1)

| | Spandex of Example # | | | | | | |
|---|---|---|---|---|---|---|---|
| | 8 | 9 | 10 | 13 | 14 | 15 | 16 |
| CE | 15 | 15 | 40 | 30 | 30 | 50 | 50 |
| Additives (2) | 8.5 | ND | 11.9 | 15.2 | ND | 13.7 | ND |
| Other Additives (3) | ND | 53.6 | ND | ND | 69.6 | ND | 76.3 |

Notes:

1) Chlorine resistance data are given in units of "hours to break." Values given are averages of six measurements. "ND" means "not determined."

2) These spandex samples contained the following additives: Cyanox® 1790 (1.5 wt %), Methacrol® 2462 (0.5 wt %), and polydimethylsiloxane silicone oil (0.6 wt %).

3) These spandex samples contained chlorine resist agents consisting of 2-4% by weight of huntite and/or hydromagnesite with 0-0.5% by weight of an additive comprising at least one mono-hindered hydroxyphenyl group and having a molecular weight of at least about 300 Daltons, in addition to the additives listed in Note #2.

Data in Table 5 show that with standard additives the spandex yarn has good chlorine durability and that known standard chlorine resist agents can be used to further boost the chlorine durability of the yarn.

For dyeability, colorfastness, and washfastness testing, fabric samples were produced in the form of circular knit tubing on a Lawson Knitting Unit (Lawson-Hemphill Company), Model "FAK". One feed of 40 denier spandex was knit to form 100% spandex fabric.

The Lawson tubing samples were dyed using procedures given in the examples. The term "% owf" means percent based on weight on fabric.

Dyeability and colorfastness were determined by measuring color shade lightness "L" values with a Color-Eye 7000 GretagMacbeth™ colorimeter spectral analyzer using Optiview Quality Control Version 4.0.3 software. Results are reported in CIELAB units. Primary illuminant was $D_{65}$. Color shade lightness "L" values on the dyed 100% spandex Lawson tube fabrics were compared to those for dyed 100% spandex Lawson tube fabric comprising the commercial spandex of Example 8. Unless otherwise specified, color differences are reported as a change in "L" value (i.e., "ΔL") between the dyed 100% spandex Lawson tube fabrics of the invention and the dyed 100% spandex Lawson tube fabric comprising the commercial spandex represented by Example 8.

The lower the "L" value, the deeper the color. In terms of comparative dyeability, a negative ΔL value indicates the sample has improved dyeability (deeper color) compared to the reference sample. The larger the absolute value of the negative ΔL value, the greater the degree of improvement in color shade difference, and hence the greater the degree of dyeability. In terms of comparative colorfastness, a negative ΔL value indicates the sample has improved color shade depth (deeper color) compared to the reference sample. The larger the absolute value of the negative ΔL value, the greater the degree of improvement in color shade difference, and hence the greater the degree of colorfastness.

To determine washfastness, pieces of dyed 100% spandex fabrics were given a standard wash stain test (American Association of Textile Chemists and Colorists Test Method 61-1996, "Colorfastness to Laundering, Home and Commercial: Accelerated"; 2A version), which is intended to simulate five typical home or commercial launderings at low-to-moderate temperatures. The test was run in the presence of multifiber test fabrics containing bands of acetate, cotton, nylon 6,6, polyester, acrylic, and wool fabric, and the degree of staining was visually rated. In the ratings, 1 and 2 are poor, 3 is fair, 4 is good, and 5 is excellent. The degree of color retention on the spandex fabrics was also determined quantitatively by using a Color-Eye 7000 GretagMacbeth™ colorimeter spectral analyzer using Optiview Quality Control Version 4.0.3 software.

Example 18

This example demonstrates dyeing of spandex fabric with a yellow vinyl sulfone cotton reactive dye. Six different 40 denier spandex samples were circular knit on a Lawson knitting machine (Lawson-Hemphill Company, FAK Sampler, single feed) using spandex yarn from Examples 8, 9, 13, 14, 15, or 16 to afford six 100% spandex fabric samples.

The scouring process was carried out at a 40:1 liquid:fabric ratio and the dyeing process was carried out at a 30:1 liquid:fabric ratio. The six Lawson tube samples were added (competitive dyeing) to a solution of 2 g/l Lubit 64, 2.0 g/l soda ash, 0.25% Versene 100, 0.50% Duponol RA, and 1.5% Merpol DA in a Mathis Labomat Dye Bath (Werner Mathis AG, Zurich Switzerland) at 100° F. The bath temperature was raised to 180° F. at 3° F./min., held at 180° F. for 30 min., cooled to 170° F. and cleared (cleared means that fresh water was passed through the bath containing the fabric until the liquid exhaust was free of added reagents or dyes). The dye bath was set at 80° F. with 2.0% Lubit 64, 1.0% Merpol LFH, and 0.1% sodium thiosulfate. The pH was adjusted to 6.0-7.0 with acetic acid. The bath temperature was raised to 120° F. at 3° F./min. A cotton reactive dye (4.0% Remazol G Yellow 3RA) was added to the dye bath, the dye bath was run for 5 minutes, 5.0 g/l sodium sulfate was added, and the system was run for 10 minutes. Then 35 g/l sodium sulfate was added and the system was run for 10 minutes. A final 35 g/l sodium sulfate was added, the bath was raised to 140° F. and the system was run for 15 minutes. 15.0 g/l soda ash was added and the system was run for 45 minutes at 140° F. The dye bath was cleared, rinsed at 100° F. with 2.0 g/l acetic acid for 10 minutes, and cleared again. A fresh bath with 2.0 g/l Lubit 64 and 0.5% Synthrapol SP was set at 100° F., raised to 200° F. at 5° F./min., held at 200° F. for 10 minutes, cleared, and air dried at room temperature.

Dyeability, colorfastness, and washfastness results for Example 18 are given in Tables 6A through 6C. Unless otherwise noted, ΔL, Δa, Δb, and ΔE values are all reported for that sample compared to the sample with spandex of Example 8.

TABLE 6A

Dyeability Data - Spandex Fabric as Dyed with Remazol Yellow 3RA Dye

| | Fabric of Spandex Example # | | | | | |
|---|---|---|---|---|---|---|
| | 8 | 9 | 13 | 14 | 15 | 16 |
| L | 82.405 | 81.764 | 82.738 | 79.417 | 68.602 | 68.962 |
| A | 9.754 | 10.530 | 9.512 | 16.435 | 39.371 | 37.499 |
| B | 44.412 | 41.005 | 44.694 | 54.086 | 86.361 | 78.591 |
| ΔL | | −0.641 | 0.333 | −2.988 | −13.803 | −13.444 |
| Δa | | 0.776 | −0.241 | 6.682 | 29.617 | 27.745 |
| Δb | | −3.407 | 0.282 | 9.675 | 41.950 | 34.180 |
| ΔE | | 3.553 | 0.499 | 12.132 | 53.174 | 46.030 |

Data in Table 6A show very good and distinctive color for fabrics of the spandex of Examples 15 and 16, as evidenced by the negative ΔL values for these samples and the magnitude of them when expressed as absolute values.

TABLE 6B

Colorfastness Data - Spandex Fabric Dyed with Remazol Yellow 3RA Dye

| | Fabric of Spandex Example # | | | | | |
|---|---|---|---|---|---|---|
| | 8 | 9 | 13 | 14 | 15 | 16 |
| After One Wash | | | | | | |
| L | 80.761 | 81.501 | 78.920 | 78.239 | 64.408 | 67.640 |
| A | 6.843 | 6.537 | 5.278 | 11.995 | 34.863 | 31.475 |
| B | 36.772 | 31.939 | 31.953 | 44.162 | 74.940 | 69.967 |

TABLE 6B-continued

Colorfastness Data - Spandex Fabric Dyed with Remazol Yellow 3RA Dye

| | Fabric of Spandex Example # | | | | | |
|---|---|---|---|---|---|---|
| | 8 | 9 | 13 | 14 | 15 | 16 |
| ΔL | | 0.741 | −1.841 | −2.521 | −16.352 | −13.121 |
| Δa | | −0.306 | −1.565 | 5.152 | 28.019 | 24.632 |
| Δb | | −4.833 | −4.819 | 7.390 | 38.168 | 33.194 |
| ΔE | | 4.899 | 5.391 | 9.355 | 50.092 | 43.367 |
| After Two Washes | | | | | | |
| L | 84.618 | 81.505 | 82.100 | 79.042 | 64.619 | 66.480 |
| A | 6.386 | 4.810 | 6.206 | 11.953 | 32.723 | 30.625 |
| B | 32.386 | 28.064 | 33.216 | 43.155 | 74.174 | 68.096 |
| ΔL | | −3.113 | −2.518 | −5.576 | −19.999 | −18.138 |
| Δa | | −1.576 | −0.180 | 5.567 | 26.336 | 24.239 |
| Δb | | −4.323 | 0.829 | 10.769 | 41.788 | 35.710 |
| ΔE | | 5.555 | 2.657 | 13.343 | 53.289 | 46.816 |
| After Three Washes | | | | | | |
| L | 78.818 | 82.217 | 84.039 | 79.804 | 63.487 | 66.102 |
| A | 2.825 | 4.261 | 7.271 | 14.397 | 32.696 | 30.663 |
| B | 25.764 | 27.186 | 33.873 | 45.986 | 72.680 | 68.383 |
| ΔL | | 3.399 | 5.221 | 0.986 | −15.331 | −12.716 |
| Δa | | 1.436 | 4.447 | 11.572 | 29.872 | 27.838 |
| Δb | | 1.422 | 8.109 | 20.223 | 46.917 | 42.619 |
| ΔE | | 3.955 | 10.62 | 23.321 | 57.693 | 52.469 |

Note: In this table, for each wash ΔL, Δa, Δb, and ΔE values are all reported for that sample compared to the sample with spandex of Example 8.

Data in Table 6B show consistently higher colorfastness for fabrics of the spandex of Examples 15 and 16, as evidenced by the negative ΔL values and the magnitude of the ΔL values when expressed as an absolute value.

TABLE 6C

Washfastness Ratings After One Wash for Spandex Fabric Dyed with Remazol Yellow 3RA Dye

| | Fabric of Spandex Example # | | | | | |
|---|---|---|---|---|---|---|
| | 8 | 9 | 13 | 14 | 15 | 16 |
| Acetate | 4.5 | 4.5 | 4.5 | 4.5 | 5 | 5 |
| Cotton | 5 | 5 | 5 | 5 | 5 | 5 |
| Nylon | 4 | 4 | 4 | 4 | 4.5 | 4.5 |
| Dacron | 5 | 5 | 5 | 5 | 5 | 5 |
| Orlon | 5 | 5 | 5 | 5 | 5 | 5 |
| Wool | 4.5 | 4.5 | 4.5 | 4.5 | 5 | 5 |

The data show that the fabric samples comprising spandex of Examples 15 and 16 have improved washfastness ratings (0.5 units) for acetate, nylon, and wool as compared to the fabric sample with spandex of Example 8.

Example 19

This example demonstrates dyeing of spandex fabric with a black vinyl sulfone cotton reactive dye. Six different 40 denier spandex samples were knit and dyed as in Example 18 except that 4% Remazol Black B dye was used. Dyeability, colorfastness, and washfastness results for Example 19 are given in Tables 7A through 7C. Unless otherwise noted, ΔL, Δa, Δb, and ΔE values are all reported for that sample compared to the sample with spandex of Example 8.

TABLE 7A

Dyeability Data - Spandex Fabric as Dyed with Remazol Black B Dye

| | Fabric of Spandex Example # | | | | | |
|---|---|---|---|---|---|---|
| | 8 | 9 | 13 | 14 | 15 | 16 |
| L | 66.042 | 67.756 | 65.146 | 68.653 | 52.976 | 57.020 |
| A | −6.022 | −5.446 | −5.967 | −5.279 | −8.377 | −7.615 |
| B | −6.079 | −6.752 | −6.789 | −5.123 | −4.780 | −5.723 |
| ΔL | | 1.714 | −0.896 | 2.612 | — | −9.022 |
| Δa | | 0.577 | 0.055 | 0.744 | −2.354 | −1.593 |
| Δ | | −0.674 | −0.710 | 0.956 | 1.298 | 0.356 |
| ΔE | | 1.93 | 1.144 | 2.879 | 13.34 | 9.168 |

Data in Table 7A show improved dyeability (negative ΔL values which, when expressed as absolute values, are significantly larger than the other ΔL values) for fabrics of the spandex of Examples 15 and 16.

TABLE 7B

Colorfastness Data After One Wash - Spandex Fabric Dyed with Remazol Black B Dye

| | Fabric of Spandex Example # | | | | | |
|---|---|---|---|---|---|---|
| | 8 | 9 | 13 | 14 | 15 | 16 |
| L | 72.524 | 75.044 | 71.741 | 75.297 | 51.192 | 58.849 |
| A | −4.136 | −4.368 | −3.639 | −3.279 | −7.634 | −7.261 |
| B | −2.189 | −3.869 | −2.645 | −0.957 | −5.095 | −4.335 |
| ΔL | | 2.520 | 0.783 | 2.773 | −21.332 | −13.676 |
| Δa | | −0.232 | 0.497 | 0.856 | −3.498 | −3.125 |
| Δb | | −1.680 | −0.456 | 1.232 | −2.906 | −2.146 |
| ΔE | | 3.037 | 1.033 | 3.153 | 21.811 | 14.191 |

Data in Table 7B show higher colorfastness for fabrics of the spandex of Examples 15 and 16, as evidenced by the negative ΔL values and the magnitude of the ΔL values when expressed as an absolute value.

TABLE 7C

Washfastness Ratings After One Wash-Spandex Fabric Dyed with Remazol Black B Dye

| | Fabric of Spandex Example # | | | | | |
|---|---|---|---|---|---|---|
| | 8 | 9 | 13 | 14 | 15 | 16 |
| Acetate | 5 | 5 | 5 | 5 | 5 | 5 |
| Cotton | 5 | 5 | 5 | 5 | 5 | 5 |
| Nylon | 5 | 5 | 5 | 5 | 5 | 5 |
| Dacron | 5 | 5 | 5 | 5 | 5 | 5 |
| Orlon | 5 | 5 | 5 | 5 | 5 | 5 |
| Wool | 5 | 5 | 5 | 5 | 5 | 5 |

The data in the Table above show that all the fabric samples have excellent washfastness.

Example 20

This example demonstrates dyeing of spandex fabric with a red vinyl sulfone cotton reactive dye. Six different 40 denier spandex samples were knit and dyed as in Example 18 except that 4% Intracron Brilliant Red VS-4BL dye was used. Dyeability, colorfastness, and washfastness results for Example 20 are given in Tables 8A through 8C.

TABLE 8A

Dyeability Data - Spandex Fabric as Dyed with Intracron Brilliant Red VS-4BL Dye

| | Fabric of Spandex Example # | | | | | |
|---|---|---|---|---|---|---|
| | 8 | 9 | 13 | 14 | 15 | 16 |
| L | 80.067 | 81.063 | 78.635 | 81.483 | 72.207 | 77.112 |
| A | 16.816 | 13.634 | 17.467 | 14.468 | 24.304 | 20.045 |
| B | −4.463 | −4.954 | −4.056 | −3.391 | −7.818 | −6.395 |
| ΔL | | 0.995 | −1.432 | 1.416 | −7.860 | −2.955 |
| Δa | | −3.182 | 0.650 | −2.348 | 7.488 | 3.228 |
| Δb | | −0.490 | 0.407 | 1.073 | −3.354 | −1.932 |
| ΔE | | 3.370 | 1.624 | 2.944 | 11.362 | 4.784 |

Data in Table 8A show improved dyeability (negative ΔL values which, when expressed as absolute values, are significantly larger than the other ΔL values) for fabrics of the spandex of Examples 15 and 16.

TABLE 8B

Colorfastness Data After One Wash for Spandex Fabric

| | Fabric of Spandex Example # | | | | | |
|---|---|---|---|---|---|---|
| | 8 | 9 | 13 | 14 | 15 | 16 |
| L | 80.484 | 85.517 | 80.030 | 84.153 | 71.081 | 77.485 |
| A | 8.585 | 6.615 | 8.748 | 3.815 | 16.930 | 12.403 |
| B | −3.306 | −3.447 | −3.278 | 1.429 | −7.379 | −6.243 |
| ΔL | | 5.034 | 0.454 | 3.669 | −9.402 | −2.999 |
| Δa | | −1.970 | 0.164 | −4.769 | 8.346 | 3.818 |
| Δb | | −0.139 | 0.030 | 1.879 | −4.071 | −2.935 |
| ΔE | | 5.407 | 0.483 | 6.304 | 13.215 | 5.673 |

Data in Table 8B show higher colorfastness for fabrics of the spandex of Examples 15 and 16, as evidenced by the negative ΔL.

TABLE 8C

Washfastness Ratings After One Wash for Spandex Fabric Dyed with Intracron Brilliant Red VS-4BL Dye

| | Fabric of Spandex Example # | | | | | |
|---|---|---|---|---|---|---|
| | 8 | 9 | 13 | 14 | 15 | 16 |
| Acetate | 5 | 5 | 5 | 5 | 5 | 5 |
| Cotton | 4 | 4.5 | 4 | 4.5 | 4.5 | 4.5 |
| Nylon | 5 | 5 | 5 | 5 | 5 | 5 |
| Dacron | 5 | 5 | 5 | 5 | 5 | 5 |
| Orlon | 5 | 5 | 5 | 5 | 5 | 5 |
| Wool | 5 | 5 | 5 | 5 | 5 | 5 |

The data in the Table above show that fabric samples of the spandex from Examples 9, 14, 15, and 16 show improved washfastness for cotton, relative to the fabric of spandex Example 8.

Example 21

This example demonstrates dyeing of spandex fabric with a blue monochlorotriazine cotton reactive dye. Six different 40 denier spandex samples were knit and dyed as in Example 18 except that 4% Procion Blue HEXL dye was used and, after adding the 15.0 g/l of soda ash, the temperature was raised slowly to 205° F. before being run for 45 minutes at 205° F. Dyeability and colorfastness results for Example 21 are given in Tables 9A and 9B.

TABLE 9A

Dyeability Data - Spandex Fabric
as Dyed with Procion Blue HEXL Dye

| | Fabric of Spandex Example # | | | | | |
|---|---|---|---|---|---|---|
| | 8 | 9 | 13 | 14 | 15 | 16 |
| L | 82.642 | 85.39 | 83.739 | 85.812 | 83.044 | 82.348 |
| A | −1.822 | −2.382 | −1.742 | −2.122 | −2.802 | −3.297 |
| B | −0.694 | −4.652 | −0.421 | −1.262 | 3.192 | 0.208 |
| ΔL | | 2.748 | 1.097 | 3.17 | 0.402 | −0.294 |
| Δa | | −0.56 | 0.08 | −0.3 | −0.98 | −1.475 |
| Δb | | −3.958 | 0.273 | −0.568 | 3.886 | 0.902 |
| ΔE | | 4.851 | 1.133 | 3.234 | 4.027 | 1.754 |

Data in the Table above show poor dyeability for fabrics of all spandex samples with this dye.

TABLE 9B

Colorfastness Data After One Wash-Spandex
Fabric Dyed with Procion Blue HEXL Dye

| | Fabric of Spandex Example # | | | | | |
|---|---|---|---|---|---|---|
| | 8 | 9 | 13 | 14 | 15 | 16 |
| L | 84.742 | 86.383 | 87.278 | 88.889 | 85.982 | 85.606 |
| A | −1.564 | −1.989 | −1.577 | −1.59 | −2.162 | −2.517 |
| B | 0.438 | −1.899 | 0.944 | 1.731 | 3.894 | 1.775 |
| ΔL | | 1.642 | 2.537 | 4.148 | 1.241 | 0.865 |
| Δa | | −0.425 | −0.013 | −0.026 | −0.598 | −0.954 |
| Δb | | −2.336 | 0.507 | 1.294 | 3.456 | 1.338 |
| ΔE | | 2.887 | 2.587 | 4.345 | 3.721 | 1.857 |

Data in the Table above show poor dyeability with this dye.

Example 22

This example demonstrates dyeing of spandex fabric with a fluorochlorotriazine cotton reactive dye. Six different 40 denier spandex samples were circular knit on a Lawson knitting machine using spandex yarn from Examples 8, 9, 13, 14, 15, or 16 to afford six 100% spandex fabric samples.

The six spandex samples were combined with six cotton fabric samples (each having the same weight as the spandex fabric) and added to 6 individual solutions of 2 g/l Lubit 64, 2 g/l soda ash, 0.25% Versene 100, 0.50 % Duponol RA, and 1.50% Merpol DA in an Ahiba Texomat Dye Bath (Ahiba AG, Birsfelden Switzerland) at a 40:1 liquid:fabric ratio at 100° F. The bath temperature was raised to 180° F. at 2° F./min., run 30 min. at 180° F., cooled to 170° F. and cleared. The dye bath was set at 80° F. at a 20:1 liquid:fabric ratio with 1 g/l sodium bicarbonate, 0.07 g/l caustic soda, and 30 g/l sodium sulfate anhydrous (pH 9.2). Reactive dye Levafix Scarlet E-2GA (1.0%) was added and the temperature was raised to 120° F. at 2° F./min., and held at 120° F. for 60 min (pH at temperature and throughout 60 min. reaction time remained 9.3). A 1.5 ml/l caustic soda solution (35%) was added (solution pH 10.65). After stirring an additional 30 min. (pH 10.4-10.5), the fabrics were rinsed twice with 1 g/l soda ash and 1 g/l Merpol LFH at 175° F. for 15 min., clear with water, rinse with water for 10 min at 175° F., and air dried.

Dyeability results for the spandex fabrics of Example 22 are given in Table 10. Unless otherwise noted, ΔL, Δa, Δb, and ΔE values are all reported for that sample compared to the sample with spandex of Example 8.

TABLE 10

Dyeability Data - Spandex Fabric as
Dyed with Levafix Scarlet E-2GA Dye

| | Fabric of Spandex Example # | | | | | |
|---|---|---|---|---|---|---|
| | 8 | 9 | 13 | 14 | 15 | 16 |
| L | 86.292 | 86.518 | 84.689 | 86.665 | 75.227 | 78.627 |
| A | 3.565 | 2.693 | 5.159 | 4.935 | 19.01 | 14.727 |
| B | 7.108 | 3.389 | 7.261 | 6.316 | 15.185 | 11.62 |
| ΔL | | 0.226 | −1.603 | 0.373 | −11.065 | −7.665 |
| Δa | | −0.872 | 1.594 | 1.37 | 15.445 | 11.162 |
| Δb | | −3.719 | 0.154 | −0.792 | 8.077 | 4.512 |
| ΔE | | 3.827 | 2.266 | 1.626 | 20.645 | 14.273 |

The results show light dyeability for samples comprising spandex from Examples 15 and 16 and essentially undetectable dyeability for samples comprising spandex from Examples 8 and 9.

Example 23

This example demonstrates dyeing of spandex fabric with a fluorochlorotriazine cotton reactive dye. Six different 40 denier spandex samples were knit and dyed as in Example 22 with the following differences in procedure. The dye bath was set at 80° F. at a 20:1 liquid:fabric ratio with 1 g/l sodium bicarbonate, 0.07 g/l caustic soda, and 10 g/l sodium sulfate anhydrous (pH 9.1). Reactive dye Levafix Golden Yellow E-G (0.5%) was added and the temperature was raised to 120° F. at 2° F./min and held at 120° F. for 60 minutes. One half of a 1.5 ml/l caustic soda solution (35%) was added (solutions were pH 9.2-9.3). The solutions were agitated for 15 minutes, then the second half of the caustic soda solution was added. After stirring 5 minutes, an additional 1.5 ml/l caustic soda solution was added (solutions were pH 9.4-9.6 except that with spandex of Example 16, which was 11.0). After stirring 10 minutes, an additional 3.0 ml of 0.75 ml/l caustic soda was added to all solutions except that containing spandex of Example 16, and the solution pH's increased to 10.3-10.4. After stirring an additional 30 minutes, the fabrics were rinsed twice with 1 g/l soda ash and 1 g/l Merpol LFH at 175° F. for 15 minutes, cleared with water, rinsed with water at 175° F. for 10 minutes, and air dried.

Dyeability results for the spandex fabrics of Example 23 are given in Table 11. Unless otherwise noted, ΔL, Δa, Δb, and ΔE values are all reported for that sample compared to the sample with spandex of Example 8.

TABLE 11

Dyeability Data-Spandex Fabric as Dyed
with Levafix Golden Yellow E-G Dye

| | Fabric of Spandex Example # | | | | | |
|---|---|---|---|---|---|---|
| | 8 | 9 | 13 | 14 | 15 | 16 |
| L | 88.947 | 89.031 | 86.604 | 90.288 | 87.938 | 89.65 |
| A | −0.301 | −1.223 | −0.143 | 0.044 | −0.582 | −0.281 |
| B | 5.598 | 1.696 | 5.439 | 5.59 | 8.479 | 7.96 |
| ΔL | | 0.084 | −2.343 | 1.341 | −1.009 | 0.703 |
| Δa | | −0.922 | 0.158 | 0.345 | −0.282 | 0.02 |
| Δb | | −3.901 | −0.158 | −0.008 | 2.881 | 2.362 |
| ΔE | | 4.01 | 2.354 | 1.385 | 3.066 | 2.464 |

Data in the Table above show poor dyeability for fabrics of all spandex samples with this dye.

Example 24

This example demonstrates dyeing of spandex fabric with a blue acid dye. Six different 40 denier spandex samples were circular knit on a Lawson knitting machine using spandex yarn from Examples 8, 9, 13, 14, 15, or 16 to afford six 100% spandex fabric samples.

The scouring was carried out at a 40:1 liquid:fabric ratio and the dyeing process was carried out at a 20:1 liquid:fabric ratio. The six spandex samples were combined with six cotton fabric samples (each having the same weight as the spandex fabric) and added to 6 individual solutions of 1.0 g/l Lubit 64, 0.50 g/l TSP, and 0.5 g/l Merpol LFH in a Ahiba Texomat Dye Bath (Ahiba AG, Birsfelden Switzerland) at 100° F. The bath temperature was raised to 180° F. at 2° F./min., run 20 min. at 180° F., cooled and cleared. The dye bath was set at 62° F. with 3.0 g/l Merpol LFH, 4.0 g/l ammonium sulfate was added, then the pH was adjusted to 8.5-9.0 with ammonium hydroxide. The solution was stirred 5 min., then 1.0% Sandolan Blue E-BL 200 was added. The temperature was raised to 205° F. at 2° F./min. and held at 205° F. for 45 min. The dye bath was cooled, cleared, and the samples were air dried at room temperature.

Dyeability results for the spandex fabrics of Example 24 are given in Table 12. Values of ΔL, Δa, Δb, and ΔE are all based on the sample with spandex of Example 8.

TABLE 12

Dyeability Data-Spandex Fabric as Dyed with Sandolan Blue E-BL 200 Dye

| | Fabric of Spandex Example # | | | | | |
|---|---|---|---|---|---|---|
| | 8 | 9 | 13 | 14 | 15 | 16 |
| L | 82.262 | 82.186 | 81.939 | 81.046 | 67.991 | 71.513 |
| A | −1.249 | −2.759 | −1.398 | −2.832 | −4.705 | −4.451 |
| B | 2.212 | −3.318 | 0.561 | −2.434 | −5.468 | −4.535 |
| ΔL | | −0.077 | −0.323 | −1.217 | −14.271 | −10.749 |
| Δa | | −1.51 | −0.149 | 1.583 | −3.456 | −3.202 |
| Δb | | −5.53 | −1.651 | −4.646 | −7.68 | −6.747 |
| ΔE | | 5.733 | 1.689 | 5.057 | 16.571 | 13.089 |

The data shows superior dyeability (negative ΔL values which, when expressed as absolute values, are significantly larger than the other ΔL values) for the fabric samples comprising spandex of Examples 15 and 16.

Example 25

This example demonstrates dyeing of spandex fabric with a yellow acid dye. Six different 40 denier spandex samples were knit and dyed as in Example 24 except that Sandolan Golden Yellow MF-RL dye was used. Dyeability results are given in Table 13. Values of ΔL, Δa, Δb, and ΔE are all based on the sample with spandex of Example 8.

TABLE 13

Dyeability Data-Spandex Fabric as Dyed with Sandolan Golden Yellow MF-RL Dye

| | Fabric of Spandex Example # | | | | | |
|---|---|---|---|---|---|---|
| | 8 | 9 | 13 | 14 | 15 | 16 |
| L | 65.853 | 62.882 | 63.092 | 61.800 | 58.502 | 59.984 |
| A | 37.068 | 38.025 | 41.038 | 41.870 | 44.895 | 43.261 |
| B | 82.541 | 76.306 | 79.594 | 77.780 | 73.561 | 73.753 |
| ΔL | | −2.971 | −2.760 | −4.052 | −7.350 | −5.869 |
| Δa | | 0.958 | 3.970 | 4.802 | 7.827 | 6.193 |
| Δb | | −6.235 | −2.947 | −4.761 | 8.980 | −8.788 |
| ΔE | | 6.973 | 5.663 | 7.884 | 13.998 | 12.248 |

The data shows superior dyeability for the fabric samples comprising spandex of Examples 15 and 16.

The knee highs used in the next three examples were knit on a Lonati 404 sheer hosiery knitting machine at 1.5 g tension using spandex from Example 17 as indicated below. Comparison knee highs were knit in the same way but using commercially available Lycra® T-162B spandex which is representative of spandex prepared as in Example 9, for the 40 denier spandex.

Top
Feed 1: 180D Lycra® T-902C spandex plated with 15/7 flat nylon and 40 denier spandex
Feeds 2, 3, 4: 40/13 (textured) nylon
Body
Feed 1:15/7 flat nylon plated with 40 denier spandex
Toe
Feed 1: 40/13 textured nylon plated inside with 15/7 flat nylon and 40 denier spandex For the knee high examples, the scouring was carried out at a 40:1 liquid:fabric ratio and the dyeing process was carried out at a 20:1 liquid:fabric ratio in a Mathis Labomat Dye Bath (Werner Mathis AG, Zurich Switzerland).

The knee highs were added (competitive scouring and dyeing) to a scouring bath solution of 1 g/l Lubit 64, 0.50 g/l TSP, and 0.5 g/l Merpol LFH at 100° F. The bath temperature was raised to 180° F. at 3° F./min., held at 180° F. for 20 min., cooled to 170° F. and cleared (cleared means that fresh water was passed through the bath containing the fabric until the liquid exhaust was free of added reagents or dyes).

Example 26

This example demonstrates dyeing of a garment comprising nylon and spandex with a black acid dye.

The dye bath was set at 90° F. with 1.0% Virconyl 431. Nylon black PVF acid dye (6%) was added, the pH was adjusted to 7.5-8.0 with ammonia and run 15 min at 90° F. The temperature was raised to 210° F. at 3° F./min., held at 210° F. for 30 min., cooled to 170° F., pH was adjusted to 5.5-6.0 with acetic acid over 15 min., the temperature was raised to 210° F. at 3° F./min, and held at 210° F. for 30 min. The dye bath was cooled to 170° F., drained, rinsed cold for 5 min., drained, centrifuged lightly, and air dried.

Results are presented in Table 14. Color differences could be seen clearly between the two sets of knee highs. Less spandex was visible in the knee highs comprising the more highly dyed spandex of Example 17 due to improved color consistency (or union) between the spandex and the hard fiber.

TABLE 14

| | Knee Highs Knit with Nylon and Commercially available Lycra(R) T-162B Spandex | Knee Highs Knit with Nylon and Spandex of Example 17 |
|---|---|---|
| L | 18.588 | 15.598 |
| A | 0.404 | 0.094 |
| B | −1.408 | −1.599 |
| ΔL | | −2.990 |
| Δa | | −0.309 |
| Δb | | −0.191 |
| ΔE | | 3.012 |

Example 27

This example demonstrates dyeing of a garment comprising nylon and spandex with a mixture of acid dyes chosen to impart a tan color to the knee highs.

The dye bath was set at 90° F. with 3.0% Virconyl 431. The acid dyes (0.27% nylanthrene blue GLF, 0.513% nylanthrene orange SLF, 0.097% nylanthrene red 2RDF) were added, the pH was adjusted to 7.5-8.0 with TSPP. The bath was run 30 min. at 90° F., raised to 200° F. at 3° F./min., and held at 200° F. for 30 min. The dye bath was drained, rinsed cold for 5 min., drained, centrifuged lightly, and air dried.

Results are presented in Table 15. Color differences could be seen clearly between the two sets of knee highs. Less spandex was visible in the knee highs comprising the more highly dyed spandex of Example 17 due to improved color consistency (or union) between the spandex and the hard fiber.

TABLE 15

| | Knee Highs Knit with Nylon and Commercially available Lycra(R) T-162B Spandex | Knee Highs Knit with Nylon and Spandex of Example 17 |
|---|---|---|
| L | 36.192 | 31.435 |
| a | 9.815 | 10.290 |
| b | 15.788 | 16.524 |
| ΔL | | −4.757 |
| Δa | | 0.475 |
| Δb | | 0.736 |
| ΔE | | 4.837 |

Example 28

This example demonstrates dyeing of a garment comprising nylon and spandex with a red acid dye.

The dye bath was set at 90° F. with 0.5% Merpol LFH) and 1.0% ammonium sulfate. The pH was adjusted to 8.5-9.0 with ammonium hydroxide and run 5 min. Polar Red 3BN 140% (2.0%) was added, run 10 min. at 90° F., the temperature was raised to 180° F. at 3° F./min., the temperature was raised to 205° F. at 2° F./min, and run 45 min. at 205° F. The bath was cooled, cleared, and air dried.

Results are presented in Table 16. Color differences could be seen clearly between the two sets of knee highs. Less spandex was visible in the knee highs comprising the more highly dyed spandex of Example 17 due to improved color consistency (or union) between the spandex and the hard fiber.

TABLE 16

| | Knee Highs Knit with Nylon and Commercially available Lycra(R) T-162B Spandex | Knee Highs Knit with Nylon and Spandex of Example 17 |
|---|---|---|
| L | 32.087 | 28.299 |
| a | 51.124 | 53.109 |
| b | −2.354 | 2.582 |
| ΔL | | −3.788 |
| Δa | | 1.985 |
| Δb | | 4.936 |
| ΔE | | 6.531 |

Example 29

Color yield tests were performed by immersing the 100% spandex knitted Lawson tube fabric samples in a dye solution, liquor ratio 10:1, with 1.2% owf of Nylosan Brilliant Blue N-FL 180% C.l. Acid Blue 278 (available from Clariant) at pH 6.0. The bath temperature was raised slowly from 30° C. to 98° C. and held at 98° C. for 60 minutes. At the end of the dyeing, the dye-baths of each sample were kept to assess the amount of dye exhaustion on the spandex samples. In each separate exhaust bath, a sample of polyamide 66 78 decitex, 68 filaments semi-dull fabric was immersed into the cooled exhaustion dye bath, and the dyeing method repeated. L-values for the spandex samples and the polyamide samples are reported in Table 17.

TABLE 17

| Example # | Fabric Knitted with Spandex Yarn from Example # | L-Value for Dyed Spandex Fabric | L-Value for Polyamide 66 Fabric Dyed with Exhaust Bath |
|---|---|---|---|
| 29 A | 8 | 28.82 | 69.81 |
| 29 B | 9 | 34.63 | 67.69 |
| 29 C | 13 | 25.7 | 72.83 |
| 29 D | 14 | 31.07 | 72.94 |
| 29 E | 15 | 22.62 | 89.24 |
| 29 F | 16 | 26.79 | 81.11 |

The data show increased dye yields for the spandex of the invention in that the polyamide samples dyed with the exhaust bath of the comparison spandex samples are more highly colored (have a lower L value) than the polyamide samples dyed with the exhaust bath of the spandex of the invention.

Example 30

Experiments were performed to determine the rate of dye uptake. Each Lawson tube 100% spandex sample was dyed separately at a liquor ratio of 10:1 with 0.6% Nylosan Brilliant Blue N-FL 180% C.l. Acid Blue 278 at pH 6.0. The bath temperature was raised slowly at 1° C. per minute to 98° C. Samples of dye bath solution were taken from each cell as the dyeing temperatures were increased to 40° C., 50° C., 60° C., 70° C., 80° C., 90° C, and 98° C., and a sample of the dyebath solution was also taken at the end of the dyeing cycle after 60 minutes at 98° C. In each separate exhaust dye bath a sample of polyamide 66 78 decitex, 68 filaments semi-dull fabric was immersed and dyed to illustrate the amount of dyestuff not taken up by the spandex sample. L values for the dyed spandex fabrics are reported in Table 18A, L values for the polyamide fabrics dyed with the exhaust bath samples are reported in Table 18B.

TABLE 18A

L Values for Spandex Fabric Dyed at Different Temperatures

| Example # | Fabric Knitted from Spandex Yarn of Example # | 40° C. | 50° C. | 60° C. | 70° C. | 80° C. | 90° C. | 98° C. | 98° C. after 60 min |
|---|---|---|---|---|---|---|---|---|---|
| 30A | 8 | 51.16 | 44.21 | 41.55 | 37.73 | 36.94 | 41.58 | 44.95 | 34.6 |
| 30B | 9 | 45.59 | 42.31 | 39.86 | 41.35 | 41.17 | 46.62 | 46.61 | 42.57 |
| 30C | 13 | 39.41 | 36.44 | 34.37 | 33.92 | 33.01 | 34.89 | 41.83 | 33.18 |
| 30D | 14 | 40.22 | 39.85 | 34.74 | 33.97 | 41.11 | 37.12 | 39.13 | 34.92 |
| 30E | 15 | 33.15 | 28.96 | 28.01 | 27.02 | 26.69 | 26.39 | 27.41 | 27.83 |
| 30F | 16 | 35.3 | 33.5 | 30.2 | 30.72 | 30.62 | 30.64 | 28.69 | 28.56 |

TABLE 18B

L Values for Polyamide Fabric Dyed in Exhaust Bath at Different Temperatures

| Example # | Exhaust Bath from Dyeing Fabric of Yarn Example # | 40° C. | 50° C. | 60° C. | 70° C. | 80° C. | 90° C. | 98° C. | 98° C. after 60 min |
|---|---|---|---|---|---|---|---|---|---|
| 30A | 8 | 69.11 | 68.56 | 72.6 | 70.83 | 74.18 | 70.66 | 69.49 | 75.15 |
| 30B | 9 | 70.1 | 71.75 | 71.18 | 73.97 | 73.88 | 72.26 | 67.97 | 73.45 |
| 30C | 13 | 69.79 | 75.86 | 74.98 | 75.96 | 73.32 | 71.51 | 70.99 | 76.3 |
| 30D | 14 | 73.79 | 72.21 | 75.72 | 76.11 | 74.89 | 73.37 | 71.78 | 76.09 |
| 30E | 15 | 78.26 | 87.28 | 92.15 | 92.32 | 92.61 | 91.24 | 90.47 | 91.79 |
| 30F | 16 | 76.21 | 82.7 | 85.07 | 92.4 | 90.94 | 90.19 | 88.82 | 89.8 |

The data in the above tables show increased dye fiber interaction for fabric knit from spandex of Examples 15 and 16. Fabric of Example 15 spandex shows greater dye uptake at about 40-50° C. with the dye bath clear of color at 60° C., as illustrated by the exhaust bath dyeings. Fabric of Example 16 shows greater dye uptake at about 40-60° C. with the dyebath clear of color at 70° C., as illustrated by the exhaust bath dyeings. The other samples show reduced dye uptake and no dye exhaustion.

Example 31

The rate of dye uptake and color partition when dyed competitively with a partner hard yarn containing similar dye sites was determined by dyeing 100% spandex Lawson tube samples with a polyamide 66, 78 decitex 68 filament semi dull fabric (78f68 T3) at a liquor ratio of 10:1 with 0.6% Nylosan Brilliant Blue N-FL 180% Cl Acid Blue 278 at pH 6.0. The bath temperature was raised at 1° C. per minute to 98° C. and maintained at this temperature for 60 minutes. Samples of each cell were taken and dye baths kept as temperature were increased to 40° C., 50° C., 60° C., 70° C., 80° C., 90° C., and 98° C. and a sample taken at the end of the dyeing cycle. L-values for the spandex samples and the polyamide samples are reported in Table 19.

Table 19. L Values for Spandex and Polyamide Fabrics Dyed Competitively at Different Temperatures

| Example # | Fabric Knitted from Spandex Yarn of Example # Fabric Knitted from 78f68 T3 | 40° C. | 50° C. | 60° C. | 70° C. | 80° C. | 90° C. | 98° C. | 98° C. after 60 min |
|---|---|---|---|---|---|---|---|---|---|
| 31A | 8 | 66.09 | 60.58 | 52.46 | 47.25 | 53.97 | 64.14 | 67.63 | 59.91 |
|  | 78f68 T3 | 60.78 | 53.40 | 45.36 | 43.19 | 42.49 | 39.76 | 41.76 | 41.45 |
| 31B | 9 | 54.49 | 47.94 | 48.89 | 48 | 50.5 | 59.75 | 65.5 | 60.18 |
|  | 78f68 T3 | 62.45 | 55.37 | 50.28 | 44.39 | 42.42 | 40.84 | 42.27 | 40.88 |
| 31C | 13 | 52.49 | 45.95 | 47.58 | 45.87 | 46.43 | 55.72 | 58.62 | 57.69 |
|  | 78f68 T3 | 60.97 | 52.98 | 50.3 | 46.01 | 43.96 | 42.21 | 41.55 | 42.28 |
| 31D | 14 | 50.89 | 48.72 | 45.58 | 43.71 | 47.8 | 53.08 | 55.58 | 49.85 |
|  | 78f68 T3 | 62.34 | 58.39 | 52.14 | 48.35 | 44.8 | 41.93 | 40.26 | 41.73 |
| 31E | 15 | 40.18 | 36.57 | 32.66 | 31.06 | 31.74 | 31.05 | 30.81 | 30.9 |
|  | 78f68 T3 | 61.84 | 55.97 | 51.34 | 49.01 | 50.33 | 53.94 | 50.31 | 48.54 |
| 31F | 16 | 41.03 | 39.27 | 36.73 | 35.04 | 32.67 | 33.37 | 34.41 | 35.63 |
|  | 78f68 T3 | 63.31 | 56.81 | 50.21 | 50.42 | 48.71 | 48.85 | 46.26 | 46.68 |

Fabric knitted from the spandex of Examples 15 and 16 shows considerable dye uptake, dyeability, and increased color yields over the other samples. These fabric samples also show strong partition at the elevated dyeing condition at about 80-98° C. The other spandex fabric show reduced color yields relative to those containing the spandex of Examples 15 and 16.

Preparation of Fabric

In the following fabric examples, the warper was a Model 22E warper (American Liba, Inc., Piedmont, S.C.). 1340 ends of Lycra® spandex were warped onto High-Strength No. 21TN42 forged beams (available from Briggs-Shaffner Co., Winston-Salem, N.C.) at 50 or 100 yards per minute (46 or 91 meters per minute) creel speed using a flat lease. Stretch was applied by operating the pre-stretch rolls and beam at the appropriate relative revolutions per minute (rpm). The warping speed was limited by the high stretch used and the top speed of the motors; in commercial operation, refitting the warper with higher speed motors can allow for higher warping speeds. The creel was a rolling takeoff Model 6 from American Liba. The beams were 42 inches (107 cm) wide and had 21 inch (53 cm) flanges. The left, middle, and right circumferences of each beam were measured and found to be substantially the same. For all examples the pre-stretch level used was 125% and the final beam elongation was 65%.

Using sets of three beams, knitting was done on a RACOP Model 4E 32-gauge Tricot knitting machine having compound needles and a 130 inch (3302 mm) maximum working width, made by Karl Mayer. No difficulties were observed in removing the spandex from the beams. The warp was 100% bare spandex. The non-elastomeric fiber was 40 denier (44 decitex) 13-filament Type 865 Antron® nylon (a registered trademark of Invista S. à r. l.). The nylon runner length was 58 inches (147.3 cm) in all examples. The fabrics were a standard Jersey Tricot construction, the nylon being knit as 2-3/1-0 (in warp knit chain notation) and the spandex being knit as 1-0/1-2.

The greige fabrics were finished by heat-setting on a three-box Krantz pin frame dryer designed to be steam-heated up to 250° F. and electrically heated above 250° F. Dyeing was performed in an Hisaka Model H horizontal jet dyeing machine. All examples were dyed royal blue using the same standard polyamide/spandex dyeing procedure and dried at natural width (120° C./45 seconds). Fabrics were dyed and finished using the following procedure: 2.5 wt % Lanaset Blue 2R was added at 30° C./pH 7.0-7.5. Temperature was then increased to 98° C. over 45 minutes and held constant for 45 minutes. Fabric pH was adjusted to 4.5 with acetic acid, temperature was cooled to 72° C., fabric was rinsed, and then the dyebath was drained. Fabrics were then vacuumed lightly and dried at 120° C.

Example 32

Commercial Lycra(R) spandex (type T-162B), representative of spandex prepared as in Example 9, of 41.7 actual denier (46.3 decitex) was used to make a comparison fabric. The knitting tension of the spandex was 15 grams for each group of three ends and the runner length was 21.2 inches (53.8 cm), resulting in a spandex content of 17.1 wt %. Greige fabric quality was 70.7 cpi. The knit fabric had a basis weight of 291 g/m² and a load power at 80% extension of about 1790 g. Heat-setting was performed at 385° F. (196° C.) for 45 seconds with 10% overfeed at 5% over the natural width. The fabric was jet-dyed blue and then dried/finished to a final weight of 187 g/m² and width of 151 cm. Fabric properties are presented in Table 20.

Example 33

Spandex yarn from Example 17 of 41.2 actual denier (45.8 decitex) was used to make a fabric comprising spandex yarn of the invention. The knitting tension of the spandex was 15 grams for each group of three ends and the runner length was 20.7 inches (52.6 cm), resulting in a spandex content of 16.4 wt %. Greige fabric quality was 70.7 cpi. The knit fabric had a basis weight of 290 g/m² and a load power at 80% extension of about 1970 g. Heat-setting was performed at 375° F. (190° C.) for 45 seconds with 10% overfeed at 5% over the natural width. The fabric was jet-dyed blue and dried/finished to a final weight of 170 g/m² and width of 150 cm. Fabric properties are presented in Table 20.

TABLE 20

| | Example | |
|---|---|---|
| | 32 | 33 |
| Heat Set Temp (deg C.) | 196 | 190 |
| Fabric Weight (g/m^2) | 189 | 170 |
| Spandex Content (%) | 17.1 | 16.4 |
| Fabric Recovery Force @ 50% (Kg) | 0.37 | 0.35 |
| As Spun LP | 6.57 | 5.91 |
| As Spun UP | 1.12 | 1.16 |
| Initial Fiber IV | ND | 1.14 |

Data in Table 20 demonstrates that "as spun" load power (LP) enables lower spandex fabric content (when knit at constant tension), and desired fabric recovery force can be maintained even with lower weight percent spandex in the fabric.

Example 34

Spandex yarn from Example 10 of 40.0 actual denier (44 decitex) was used to make a fabric comprising spandex yarn. The knitting tension of the spandex was 15 grams for each group of three ends and the runner length was 20.0 inches (50.8 cm), resulting in a spandex content of 16.3 wt %. Greige fabric quality was 70.7 cpi. Heat-setting was performed at 375° F. (190° C.) for 45 seconds with 10% overfeed at 5% over the natural width. The fabric was jet-dyed blue and finished to a final weight of 198 g/m² and width of 156 cm.

Finished fabric had 16.3 wt % spandex content and 0.30 kg fabric recovery force at 50% extension. As-spun load power was 5.83 grams, as-spun unload power was 1.08 grams, initial fiber IV was 1.04 dl/g, and the heat-treated fiber IV was 3.06 dl/g. This data shows that acceptable fabric recovery power can be maintained, in part, through higher fiber IV after heat treatment, as during the fabric dyeing and finishing process.

What is claimed as new and desired to be protected by Letters Patent of the United States:

1. A method of making a polyurethaneurea comprising the steps of:
   (a) contacting at least one polymeric glycol selected from the group consisting of polyether glycols and polyester glycols; with a diisocyanate mixture comprising at least about 78 mole percent 4,4'-MDI and at least about 5 mole percent 2,4'-MDI; wherein the molar ratio of the at least one glycol to the total moles of diisocyanate is between about 1:1.5 and about 1:2;
   (b) contacting the product of step (a) with a composition comprising:
      (1) a solvent selected from the group consisting of N,N-dimethylacetamide, dimethylformamide, dimethyl sulfoxide, N,N-dimethylpyrrolidinone, and mixtures thereof;

(2) at least one chain extender comprising ethylenediamine or a mixture of chain extenders comprising ethylenediamine and a secondary chain extender; wherein ethylenediamine is at least about 90 mole percent of the total moles of chain extenders;

(3) a chain terminator selected from the group consisting of diethylamine, diisopropylamine, piperidine, dibutylamine, and mixtures thereof;

to form a polymer, wherein the pre-spun IV of the polymer is between about 0.65 and about 1.0 dl/g and the primary amine content is between about 25 and about 70 meq/Kg.

2. The method of claim 1 wherein: (i) the polymeric glycol is a polyether glycol having a number average molecular weight between about 1600 and about 2500; (ii) the molar ratio of the at least one glycol to the total moles of diisocyanate is between about 1:1.6 and about 1:1.8; and (iii) the diisocyanate mixture comprises between about 80 and about 95 mole percent 4,4'-MDI and further comprises between about 5 and about 20 mole percent 2,4'-MDI.

3. The method of claim 2 wherein: (i) the polyether glycol has a number average molecular weight between about 1800 and about 2000 and is selected from the group consisting of polyethyleneether glycol, polytrimethyleneether glycol, polytetramethyleneether glycol, polytetramethylene-co-2-methyl-tetramethyleneether glycol, polytetramethylene-co-tetraethyleneether glycol, and mixtures thereof; and (ii) at least one secondary chain extender is present and selected from 2-methyl-1,5-pentanediamine and 1,2-propanediamine.

4. The method of claim 3 wherein: (i) the polyether glycol is polytetramethyleneether glycol having a number average molecular weight of about 1800; (ii) the diisocyanate mixture comprises between about 83 and about 91 mole percent 4,4'-MDI and further comprises between about 9 and about 17 mole percent 2,4'-MDI and further comprises less than 1 mole percent 2,2'-MDI; (iii) the chain terminator is diethylamine; and (iv) the solvent is N,N-dimethylacetamide.

5. A polyurethaneurea polymer formed by the reaction of:
(a) at least one polymeric glycol selected from the group consisting of polyether glycols and polyester glycols;
(b) a diisocyanate mixture comprising at least about 78 mole percent 4,4'-MDI and at least about 5 mole percent 2,4'-MDI; wherein the molar ratio of the at least one glycol to the total moles of diisocyanate is between about 1:1.5 and about 1:2; and
(c) a composition comprising:
(1) at least one chain extender comprising ethylenediamine or a mixture of chain extenders comprising ethylenediamine and a secondary chain extender; wherein ethylenediamine is at least about 90 mole percent of the total moles of chain extenders;
and (2) a chain terminator selected from the group consisting of diethylamine, diisopropylamine, piperidine, dibutylamine, and mixtures thereof;
wherein the resulting polyurethaneurea polymer has a pre-spun IV between about 0.65 and about 1.0 dl/g and a primary amine content between about 25 and about 70 meq/Kg.

6. The polyurethaneurea polymer of claim 5 wherein: (i) the polymeric glycol is a polyether glycol having a number average molecular weight between about 1600 and about 2500; (ii) the molar ratio of the at least one glycol to the total moles of diisocyanate is between about 1:1.6 and about 1:1.8; and (iii) the diisocyanate mixture comprises between about 80 and about 95 mole percent 4,4'-MDI and further comprises between about 5 and about 20 mole percent 2,4'-MDI.

7. The polyurethaneurea polymer of claim 6 wherein: (i) the polyether glycol has a number average molecular weight between about 1800 and about 2000 and is selected from the group consisting of polyethyleneether glycol, polytrimethyleneether glycol, polytetramethyleneether glycol, polytetramethylene-co-2-methyl-tetramethyleneether glycol, polytetramethylene-co-tetraethyleneether glycol, and mixtures thereof; (ii) at least one secondary chain extender is present and selected from 2-methyl-1,5-pentanediamine and 1,2-propanediamine.

8. The polyurethaneurea polymer of claim 7 wherein: (i) the polyether glycol is polytetramethyleneether glycol having a number average molecular weight of about 1800; (ii) the diisocyanate mixture comprises between about 83 and about 91 mole percent 4,4'-MDI and further comprises between about 9 and about 17 mole percent 2,4'-MDI and further comprises less than 1 mole percent 2,2'-MDI; and (iii) the chain terminator is diethylamine.

9. Spandex prepared from the polyurethaneurea polymer of claim 5.

* * * * *